United States Patent
Inoue et al.

(10) Patent No.: US 11,773,278 B2
(45) Date of Patent: *Oct. 3, 2023

(54) AQUEOUS INK

(71) Applicant: KAO CORPORATION, Tokyo (JP)

(72) Inventors: Masashi Inoue, Wakayama (JP); Daiki Kawata, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/503,816

(22) Filed: Oct. 18, 2021

(65) Prior Publication Data

US 2022/0033668 A1 Feb. 3, 2022

Related U.S. Application Data

(62) Division of application No. 16/626,419, filed as application No. PCT/JP2018/024877 on Jun. 29, 2018, now Pat. No. 11,180,671.

(30) Foreign Application Priority Data

Jul. 3, 2017 (JP) ................. 2017-130672

(51) Int. Cl.
C09D 11/322 (2014.01)
B41M 5/00 (2006.01)
(Continued)

(52) U.S. Cl.
CPC .............. C09D 11/322 (2013.01); B41J 2/01 (2013.01); B41J 2/2107 (2013.01); B41M 5/0023 (2013.01); B41M 5/5254 (2013.01); C09D 11/023 (2013.01); C09D 11/033 (2013.01); C09D 11/037 (2013.01);
(Continued)

(58) Field of Classification Search
CPC .... B41J 3/4078; B41J 11/0021; B41J 11/002; B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/16538; B41J 2/175; B41J 2/17563; B41J 29/02; B41J 2/17513; B41J 2/17509; B41J 29/13; B41J 2/17553; B41J 2/1606; B41J 2/1642; B41J 2/1609; B41J 2/1433; B41J 2/164; B41J 2/162; B41J 2/161; B41J 2/19; B41J 15/04; B41J 2/1623; B41J 2202/00; B41J 2202/03; B41J 2/14201; B41J 2/045; B41J 11/0015; B41J 2/04581; B41J 2/055; B41J 2002/16502; B41J 2/04588; B41J 2/04595; B41J 2/04586; B41J 2/14274; B41J 2/01; B41J 2/211; B41J 2/17; B41J 2/17593; B41J 2/2107; B41J 2/1755; B41J 2/2114; B41J 2/2117; B41J 2/2056; B41J 2/0057; B41J 3/60; B41J 2002/012; B41J 2/04598; B41F 23/042; B41F 23/0436; C09D 11/326; C09D 11/107; C09D 11/03; C09D 11/037; C09D 11/033; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS 7,273,842 B1 * 9/2007 VanDyk ................ C09D 17/00 526/75
2004/0242726 A1 12/2004 Waki et al.
(Continued)

FOREIGN PATENT DOCUMENTS

CN 101151334 A 3/2006
CN 101294015 A 10/2008
(Continued)

OTHER PUBLICATIONS

Extended European Search Report for European Application No. 18827499.7, dated Feb. 19, 2021.
(Continued)

Primary Examiner — Manish S Shah
(74) Attorney, Agent, or Firm — Birch, Stewart, Kolasch & Birch, LLP

(57) ABSTRACT

The present invention relates to a water-based ink containing at least pigment-containing water-insoluble crosslinked polymer particles (A), a polymer emulsion (B) and water, in which a water-insoluble crosslinked polymer constituting the crosslinked polymer particles (A) is obtained by subjecting a polymer that contains a constitutional unit derived from a carboxylic acid monomer having an acid value of not less than 200 mgKOH/g and a constitutional unit derived from a hydrophobic monomer, to crosslinking reaction with an epoxy compound, and a polymer constituting the polymer emulsion (B) contains a constitutional unit derived from a carboxylic acid monomer and a constitutional unit derived from a hydrophobic monomer. The water-based ink of the present invention is excellent in ejection stability and fastness of the printed characters or images while maintaining good optical density.

13 Claims, No Drawings

(51) Int. Cl.
- *B41M 5/52* (2006.01)
- *C09D 11/023* (2014.01)
- *C09D 11/033* (2014.01)
- *C09D 11/037* (2014.01)
- *C09D 11/107* (2014.01)
- *C09D 11/106* (2014.01)
- *C09D 11/326* (2014.01)
- *B41J 2/21* (2006.01)
- *B41J 2/01* (2006.01)

(52) U.S. Cl.
CPC .......... *C09D 11/106* (2013.01); *C09D 11/107* (2013.01); *C09D 11/326* (2013.01)

(56) References Cited

U.S. PATENT DOCUMENTS

| | | | |
|---|---|---|---|
| 2005/0228069 A1 | 10/2005 | Kataoka et al. | |
| 2006/0100307 A1* | 5/2006 | Uerz | C09D 11/40 523/160 |
| 2008/0269407 A1 | 10/2008 | Nishiguchi et al. | |
| 2009/0220748 A1 | 9/2009 | Kanaya et al. | |
| 2011/0057982 A1* | 3/2011 | Saito | C09D 11/102 347/20 |
| 2012/0232195 A1* | 9/2012 | Mcintyre | C09D 11/324 524/547 |
| 2012/0249663 A1 | 10/2012 | Okumura et al. | |
| 2014/0092172 A1 | 4/2014 | Ikoshi et al. | |
| 2014/0139595 A1* | 5/2014 | Hong | C09D 11/322 347/86 |
| 2014/0378606 A1* | 12/2014 | Roberts | C09D 17/001 524/548 |
| 2018/0009988 A1 | 1/2018 | Sato et al. | |
| 2019/0169455 A1 | 6/2019 | Eguchi et al. | |
| 2019/0315983 A1 | 10/2019 | Shimizu et al. | |
| 2019/0338152 A1 | 11/2019 | Suzuki et al. | |
| 2020/0156396 A1 | 5/2020 | Suzuki et al. | |

FOREIGN PATENT DOCUMENTS

| | | |
|---|---|---|
| EP | 3 006 519 A1 | 4/2016 |
| EP | 3 275 949 A1 | 1/2018 |
| EP | 3 342 833 A1 | 7/2018 |
| EP | 3 415 321 A1 | 12/2018 |
| JP | 2004-2526 A | 1/2004 |
| JP | WO2004092285 A1 | 7/2006 |
| JP | 2008-63500 A | 3/2008 |
| JP | 2010-143962 A | 7/2010 |
| JP | 2012-1875 A | 1/2012 |
| JP | 2012-92208 A | 5/2012 |
| JP | 2012-214714 A | 11/2012 |
| JP | 2014-70185 A | 4/2014 |
| JP | 8304439 B1 | 4/2018 |
| WO | WO 03/097753 A1 | 11/2003 |
| WO | WO 2012/035627 A1 | 3/2012 |
| WO | WO 2016/104505 A1 | 6/2016 |
| WO | WO 2016/181797 A1 | 11/2016 |

OTHER PUBLICATIONS

International Search Report for PCT/JP2018/024677 dated Aug. 28, 2018.

* cited by examiner

AQUEOUS INK

CROSS-REFERENCE TO RELATED APPLICATIONS

This application is a Divisional application of co-pending application Ser. No. 16/626,419, filed on Dec. 24, 2019, which is the National Phase under 35 U.S.C. § 371 of International Application No. PCT/JP2018/024877, filed on Jun. 29, 2018, which claims the benefit under 35 U.S.C. § 119(a) to Patent Application No. 2017-130672, filed in Japan on Jul. 3, 2017, all of which are hereby expressly incorporated by reference into the present application.

FIELD OF THE INVENTION

The present invention relates to a water-based ink.

BACKGROUND OF THE INVENTION

In ink-jet printing methods, droplets of ink are directly projected from very fine nozzles and allowed to adhere to a printing medium to obtain a printed material having characters or images printed on the printing medium, etc. The ink-jet printing methods have become rapidly spread because of various advantages such as easiness of full coloration, low cost, capability of using a plain paper as the printing medium, non-contact with the characters or images printed on the printing medium, etc. In particular, form the viewpoint of attaining good weathering resistance and water resistance of the resulting printed material, the ink-jet printing methods using an ink containing a pigment as a colorant have become predominant.

The pigment used in the ink is usually dispersed in an ink vehicle using a polymer dispersant. However, molecules of the pigment are incapable of being uniformly dissolved in the ink vehicle unlike dyes. For this reason, there have been proposed various methods for maintaining a good dispersed state of the pigment in the ink to improve ejection stability, etc., of the ink upon ink-jet printing.

For example, WO 2003/97753A (Patent Literature 1) discloses an ink composition for ink-jet printing as an ink that is excellent in stability, temporal stability and the like upon continuously ejecting droplets of the ink, in which the ink composition contains a water-soluble resin in the form of a copolymer of a hydrophobic monomer and a hydrophilic monomer, and a resin having a urethane bond, and is produced by compounding the water-soluble resin and a pigment, kneading and dispersing the obtained mixture to atomize the pigment, further adding the resin having a urethane bond to the mixture, and subjecting the resulting composition to crosslinking treatment with a crosslinking agent such as a polycarbodiimide.

JP 2008-63500A (Patent Literature 2) discloses a water-based ink for ink-jet printing as an ink that is capable of suppressing occurrence of such a bonze phenomenon that a color observed upon printing with the ink is different from an original color of a pigment therein, in which the ink contains a water dispersion that contains colorant-containing water-insoluble crosslinked polymer particles and core/shell polymer particles.

JP 2012-1675A (Patent Literature 3) discloses a water-based ink for ink-jet printing as an ink that is excellent in redispersibility for suppressing deterioration of ejection properties of the ink upon continuously ejecting droplets of the ink and contains a water-based dispersion of crosslinked polymer particles that are obtained by crosslinking colorant-containing polymer particles with a crosslinking agent, in which the polymer in the dispersion contains a constitutional unit derived from a salt-forming group-containing monomer (a), a constitutional unit derived from polypropylene glycol mono(meth)acrylate (b) and a constitutional unit derived from a specific nonionic monomer (c), and a difference between solubility parameters of the aforementioned monomers (b) and (c) is from 0.5 to 2.0. In addition, in Examples of JP 2012-1675A, it is further described that after adding an emulsion of the polymer containing the constitutional units derived from the aforementioned components (a), (b) and (c) to a pigment dispersion formed by dispersing a pigment mixture with "JONCRYL 61J" as a water-soluble polymer and then subjecting the resulting mixture to dispersion treatment, the resulting dispersion is subjected to crosslinking reaction to obtain a water-based dispersion of crosslinked polymer particles containing the pigment mixture.

SUMMARY OF THE INVENTION

The present invention relates to a water-based ink containing at least pigment-containing water-insoluble crosslinked polymer particles (A), a polymer emulsion (B) and water, in which a water-insoluble crosslinked polymer constituting the crosslinked polymer particles (A) is obtained by subjecting a polymer that contains a constitutional unit derived from a carboxylic acid monomer having an acid value of not less than 200 mgKOH/g and a constitutional unit derived from a hydrophobic monomer, to crosslinking reaction with an epoxy compound, and a polymer constituting the polymer emulsion (B) contains a constitutional unit derived from a carboxylic acid monomer and a constitutional unit derived from a hydrophobic monomer.

DETAILED DESCRIPTION OF THE INVENTION

The water-based ink described in Patent Literature 1 contains the acrylic water-soluble resin and the urethane-based resin, and therefore tends to suffer from non-uniformity of an ink film formed as images after printing, and also tends to be insufficient in fastness of the images.

The water-based ink described in Patent Literature 2 tends to be sometimes insufficient in ejection stability (ejection restorability) after interrupting ejection of the ink for a certain period of time as well as suppressing flocculation of a pigment, because an acid value of the carboxy group-containing polymer before being subjected to crosslinking reaction is low, and electrostatic repulsion between molecules of the polymer adsorbed onto a surface of the pigment owing to carboxy groups therein is weak. In addition, the water-based ink described in Patent Literature 3 tends to be insufficient in fastness of the resulting images in some cases.

The present invention relates to a water-based ink that is excellent in ejection stability (ejection restorability) and fastness of the printed characters or images while maintaining good optical density of the water-based ink upon printing.

The present inventors have found that the aforementioned conventional problems can be solved by a water-based ink containing pigment-containing water-insoluble crosslinked polymer particles (A) in which the pigment is included in a crosslinked polymer obtained by crosslinking a polymer containing a constitutional unit derived from a carboxylic acid monomer having an acid value of not less than 200 mgKOH/g and a specific polymer emulsion (B).

That is, the present invention relates to a water-based ink containing at least pigment-containing water-insoluble crosslinked polymer particles (A), a polymer emulsion (B) and water, in which a water-insoluble crosslinked polymer constituting the crosslinked polymer particles (A) is obtained by subjecting a polymer that contains a constitutional unit derived from a carboxylic acid monomer having an acid value of not less than 200 mgKOH/g and a constitutional unit derived from a hydrophobic monomer, to crosslinking reaction with an epoxy compound, and a polymer constituting the polymer emulsion (B) contains a constitutional unit derived from a carboxylic acid monomer and a constitutional unit derived from a hydrophobic monomer.

According to the present invention, it is possible to provide a water-based ink that is excellent in ejection stability (ejection restorability) and fastness of the printed characters or images while maintaining good optical density thereof upon printing.

[Water-Based Ink]

The water-based ink of the present invention is a water-based ink that contains at least pigment-containing water-insoluble crosslinked polymer particles (A) (hereinafter also referred to merely as "pigment-containing crosslinked polymer particles"), a polymer emulsion (B) and water (hereinafter also referred to merely as a "water-based ink" or an "ink"), in which a water-insoluble crosslinked polymer constituting the crosslinked polymer particles (A) is obtained by subjecting a polymer that contains a constitutional unit derived from a carboxylic acid monomer having an acid value of not less than 200 mgKOH/g and a constitutional unit derived from a hydrophobic monomer, to crosslinking reaction with an epoxy compound, and a polymer constituting the polymer emulsion (B) contains a constitutional unit derived from a carboxylic acid monomer and a constitutional unit derived from a hydrophobic monomer.

Meanwhile, the term "water-based" as used herein means that water has a largest content among components of a dispersing medium used for dispersing the pigment in the water-based ink. The meaning of the term "water-insoluble" as used herein is given below in the description concerning a crosslinking polymer before being subjected to crosslinking reaction.

In addition, the term "printing" as used herein means a concept that includes printing or typing for printing characters or images.

The water-based ink of the present invention serves for production of a good printed material that is excellent in optical density and fastness of the printed characters or images, and therefore can be suitably used as an ink for flexographic printing, an ink for gravure printing or an ink for ink-jet printing. In addition, the water-based ink of the present invention is also excellent in ejection stability (ejection restorability) when used in an ink-jet printing method, and therefore is preferably used as a water-based ink for ink-jet printing.

The reason why the water-based ink according to the present invention is excellent in optical density, ejection stability and fastness of the printed characters or images is considered as follows though it is not clearly determined yet.

That is, it is considered that in the water-based ink of the present invention, the polymer that contains a constitutional unit derived from a carboxylic acid monomer having an acid value of not less than 200 mgKOH/g and a constitutional unit derived from a hydrophobic monomer is adsorbed onto the surface of the pigment, and the resulting pigment-containing polymer particles are dispersed in an aqueous system. In addition, it is also estimated that the carboxy groups contained in the aforementioned polymer are reacted and crosslinked with an epoxy compound to form the polymer into a steric network structure, so that the polymer is adsorbed onto the pigment in such a state that swelling of the polymer with a solvent compounded in the ink or the like is suppressed.

For this reason, it is considered that even when the ink is exposed to severe drying conditions in the vicinity of nozzles of an ink-jet print head, the polymer is inhibited from desorbing from the pigment owing to its crosslinked structure. Furthermore, it is considered that since the carboxylic acid monomer has an acid value as high as not less than 200 mgKOH/g, an electrostatic repulsion force between the pigment-containing polymer particles is increased owing to the carboxy groups contained therein, and the pigment contained in the ink can be easily redispersed even after interrupting ejection of the ink for a certain period of time, so that the resulting water-based ink is excellent in ejection stability (ejection restorability).

In addition, it is considered that since the large electrostatic repulsion force between the pigment-containing polymer particles serves for suppressing rapid flocculation of the particles, and further the polymer emulsion that contains the polymer containing similar constitutional units to those of the polymer constituting the pigment-containing polymer particles is filled in voids between the pigment-containing polymer particles on a surface of a printing medium, a uniform film of the ink containing the pigment-containing crosslinked polymer particles is formed on the printing medium, so that the resulting ink can be improved in optical density and fastness of the printed characters or images. On the other hand, if the acid value of the carboxylic acid monomer constituting the pigment-containing polymer particles is as small as less than 200 mgKOH/g, the electrostatic repulsion force between the pigment-containing polymer particles owing to the carboxy groups contained therein tends to become insufficient owing to inclusion of the polymer emulsion, so that the resulting ink tends to be deteriorated in ejection stability and optical density.

<Pigment>

In the present invention, from the viewpoint of improving optical density and ejection stability of the resulting water-based ink and fastness of the printed characters or images, the pigment contained in the water-based ink is in the form of pigment-containing water-insoluble crosslinked polymer particles (A) (pigment-containing crosslinked polymer particles) formed by dispersing the pigment in the ink with the water-insoluble crosslinked polymer.

The pigment used in the present invention may be either an inorganic pigment or an organic pigment, and a lake pigment or a fluorescent pigment may also be used in the present invention. In addition, these pigments may also be used in combination with an extender pigment, if required.

Specific examples of the inorganic pigment include carbon blacks, metal oxides such as titanium oxide, iron oxide, red iron oxide and chromium oxide, and iridescent nacreous pigments. In particular, the carbon blacks are preferably used for black inks. The carbon blacks may include furnace blacks, thermal lamp blacks, acetylene blacks and channel blacks.

Specific examples of the organic pigment include azo pigments such as azo lake pigments, insoluble monoazo pigments, insoluble disazo pigments and chelate azo pigments; and polycyclic pigments such as phthalocyanine pigments, perylene pigments, perinone pigments, anthraquinone pigments, quinacridone pigments, dioxazine pigments, thioindigo pigments, isoindolinone pigments, quinophthalone pigments, diketopyrrolopyrrole pigments, benzimidazolone pigments and threne pigments.

The hue of the organic pigment used in the present invention is not particularly limited, and there may be used any chromatic pigment having a yellow color, a magenta color, a cyan color, a blue color, a red color, an orange color, a green color, etc.

Specific examples of the preferred organic pigments include one or more pigments selected from the group consisting of commercially available products marketed under the names of C.I. Pigment Yellow, C.I. Pigment Red, C.I. Pigment Orange, C.I. Pigment Violet, C.I. Pigment Blue and C.I. Pigment Green, etc., with various part numbers.

Examples of the extender pigment include silica, calcium carbonate and talc.

The aforementioned pigments may be used alone or in the form of a mixture of any two or more thereof.

<Water-Insoluble Crosslinked Polymer>

The water-insoluble crosslinked polymer used in the present invention is obtained by crosslinking a polymer containing a constitutional unit derived from a carboxylic acid monomer having an acid value of not less than 200 mgKOH/g and a constitutional unit derived from a hydrophobic monomer.

The aforementioned polymer before being subjected to crosslinking reaction (hereinafter also referred to merely as a "crosslinking polymer") is in the from of a carboxy group-containing polymer. As the carboxy group-containing polymer, there may be used any of a water-soluble polymer and a water-insoluble polymer. Among these polymers, preferred is a water-insoluble polymer. The carboxy groups contained in the crosslinking polymer may be partially crosslinked with an epoxy compound to form a crosslinked structure from the viewpoint of improving optical density and ejection stability of the resulting water-based ink and fastness of the printed characters or images. Even when the carboxy group-containing polymer is in the form of a water-soluble polymer, such a polymer is converted into a water-insoluble polymer by subjecting the polymer to the crosslinking reaction.

The terms "water-soluble" and "water-insoluble" as used herein have the following meanings. That is, when a polymer is dried to a constant weight at 105° C. for 2 hours and then dissolved in 100 g of water at 25° C. until reaching a saturation concentration thereof, in the case where the solubility in water of the polymer is more than 10 g, the polymer is regarded as being water-soluble, whereas in the case where the solubility in water of the polymer is not more than 10 g, the polymer is regarded as being water-insoluble. The solubility in water of the water-insoluble polymer is preferably not more than 5 g and more preferably not more than 1 g. In the case where the water-insoluble polymer is in the form of an anionic polymer, the solubility means a solubility in water of the water-insoluble polymer whose anionic groups are neutralized completely (i.e., 100%) with sodium hydroxide.

Examples of the configuration of the pigment and the water-insoluble crosslinked polymer which are present in the water-based ink include the configuration in which the water-insoluble crosslinked polymer is adsorbed onto the pigment, and the configuration in which the pigment is included in the water-insoluble crosslinked polymer. From the viewpoint of improving dispersion stability of the pigment, the pigment and the water-insoluble crosslinked polymer used in the present invention are preferably present in the form of polymer particles formed by incorporating the pigment in the water-insoluble crosslinked polymer, and is more preferably present in the form of polymer particles in which the pigment is enclosed or encapsulated in the respective water-insoluble crosslinked polymer particles.

(Carboxy Group-Containing Polymer)

The carboxy group-containing polymer used in the present invention has a function as a pigment dispersant exhibiting the effect of dispersing the pigment as well as a function as a fixing agent for fixing the resulting water-based ink onto a printing medium.

The acid value of the aforementioned polymer is not less than 200 mgKOH/g, preferably not less than 210 mgKOH/g, more preferably not less than 220 mgKOH/g and even more preferably not less than 235 mgKOH/g, and is also preferably not more than 320 mgKOH/g, more preferably not more than 300 mgKOH/g and even more preferably not more than 270 mgKOH/g. When the acid value of the polymer lies within the aforementioned range, the amount of the carboxy groups in the polymer is sufficient.

The acid value of the polymer may be measured by the method described in Examples below. Alternatively, the acid value of the polymer may also be calculated from a mass ratio between the monomers constituting the polymer.

The carboxy group-containing polymer used in the present invention contains the constitutional unit derived from the carboxylic acid monomer and the constitutional unit derived from the hydrophobic monomer. Form the viewpoint of improving storage stability of the resulting water-based ink, the carboxy group-containing polymer is preferably a vinyl-based polymer that is produced by addition-polymerizing a vinyl compound as a monomer thereof.

The vinyl-based polymer used in the present invention is preferably a vinyl-based polymer that is produced by copolymerizing a monomer mixture containing a carboxylic acid monomer (a) (hereinafter also referred to merely as a "component (a)") and a hydrophobic monomer (b) (hereinafter also referred to merely as a "component (b)") (such a mixture is hereinafter also referred to merely as a "monomer mixture"). The vinyl-based polymer contains a constitutional unit derived from the component (a) and a constitutional unit derived from the component (b). In addition, the vinyl-based polymer may further contain a constitutional unit derived from a nonionic monomer (c) (hereinafter also referred to merely as a "component (c)").

[(a) Carboxylic Acid Monomer]

The carboxylic acid monomer (a) serves for forming the constitutional unit derived from the carboxylic acid monomer in the crosslinking polymer. The carboxylic acid monomer (a) is used as a monomer component of the carboxy group-containing polymer from the viewpoint of improving dispersion stability of the pigment-containing crosslinked polymer particles in the water-based ink.

Specific examples of the carboxylic acid monomer include acrylic acid, methacrylic acid, crotonic acid, itaconic acid, maleic acid, fumaric acid, citraconic acid and 2-methacryloyloxymethylsuccinic acid. Among these carboxylic acid monomers, preferred is at least one monomer selected from the group consisting of acrylic acid and methacrylic acid, and more preferred is acrylic acid.

[(b) Hydrophobic Monomer]

The hydrophobic monomer (b) serves for forming the constitutional unit derived from the hydrophobic monomer in the crosslinking polymer. The hydrophobic monomer (b) is used as a monomer component of the polymer from the viewpoint of improving dispersion stability of the pigment-containing crosslinked polymer particles in the water-based ink. Examples of the hydrophobic monomer include at lest one monomer selected rom the group consisting of alkyl (meth)acrylates, and aromatic group-containing monomers such as styrene-based monomers, aromatic group-containing (meth)acrylates and styrene-based macromonomers.

The preferred alkyl (meth)acrylates are those alkyl (meth) acrylates containing an alkyl group usually having 1 to 22 carbon atoms and preferably 6 to 18 carbon atoms. Examples of the alkyl (meth)acrylates include methyl (meth) acrylate, ethyl (meth)acrylate, (iso)propyl (meth)acrylate, (iso- or tertiary-)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate.

Meanwhile, the terms "(iso- or tertiary-)" and "(iso)" as used herein mean both the structure in which any of the groups expressed by "iso- or tertiary-" and "iso" is present, and the structure in which any of these groups is not present (i.e., normal). In addition, the term "(meth)acrylate" means an acrylate and/or a methacrylate.

The aromatic group-containing monomer is preferably a vinyl monomer containing an aromatic group having 6 to 22 carbon atoms which may also contain a substituent group containing a hetero atom, and more preferably at least one monomer selected from the group consisting of a styrene-based monomer, an aromatic group-containing (meth)acrylate and a styrene-based macromonomer.

Specific examples of the preferred styrene-based monomer include styrene, 2-methyl styrene and divinyl benzene. Among these styrene-based monomers, more preferred is styrene.

Specific examples of the preferred aromatic group-containing (meth)acrylate include benzyl (meth)acrylate and phenoxyethyl (meth)acrylate. Among these aromatic group-containing (meth)acrylates, more preferred is benzyl (meth) acrylate.

The styrene-based macromonomer is in the form of a compound containing a polymerizable functional group at one terminal end thereof and having a number-average molecular weight of preferably not less than 500 and more preferably not less than 1000 and also preferably not more than 100,000 and more preferably not more than 10,000. Examples of the polymerizable functional group contained in the styrene-based macromonomer is preferably an acryloyloxy group or a methacryloyloxy group and more preferably a methacryloyloxy group.

Specific examples of the styrene-based macromonomer include "AS-6(S)", "AN-6(S)" and "HS-6(S)" (tradenames) all available from Toagosei Co., Ltd., etc.

[(c) Nonionic Monomer]

From the viewpoint of improving dispersion stability of the pigment-containing crosslinked polymer particles in the water-based ink, the carboxy group-containing polymer may further contain a nonionic monomer (c) as a monomer component thereof. More specifically, the carboxy group-containing polymer may further contain a constitutional unit derived from the nonionic monomer (c).

Examples of the nonionic monomer (c) include 2-hydroxyethyl (meth)acrylate, 3-hydroxypropyl (meth)acrylate, a polyalkylene glycol (meth)acrylate such as polypropylene glycol (n=2 to 30 wherein n represents an average molar number of addition of oxyalkylene groups: hereinafter defined in the same way) (meth)acrylate and polyethylene glycol (n=2 to 30) (meth) acrylate, an alkoxy polyalkylene glycol (meth)acrylate such as methoxy polyethylene glycol (n=1 to 30) (meth)acrylate, and phenoxy (ethylene glycol/ propylene glycol copolymer) (n=1 to 30 in which n for ethylene glycol is 1 to 29) (meth)acrylate. Among these nonionic monomers, preferred are polypropylene glycol (n=2 to 30) (meth)acrylate and phenoxy (ethylene glycol/ propylene glycol copolymer) (meth)acrylate, more preferred is polypropylene glycol (n=2 to 30) (meth)acrylate.

Specific examples of commercially available products of the component (c) include "NK ESTER M-20G", "NK ESTER M-40G", "NK ESTER M-90G", "NK ESTER M-230G" and the like all available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like all available from NOF Corporation.

The aforementioned components (a) to (c) may be respectively used alone or in the form of a mixture of any two or more thereof.

As described above, the carboxy group-containing polymer used in the present invention is preferably in the form of a vinyl-based polymer containing a constitutional unit derived from at least one carboxylic acid monomer (a) selected from the group consisting of acrylic acid and methacrylic acid and a constitutional unit derived from at least one hydrophobic monomer (b) selected from the group consisting of an alkyl (meth)acrylate monomer and an aromatic group-containing monomer. The carboxy group-containing polymer may also be in the form of a vinyl-based polymer further containing a constitutional unit derived from the nonionic monomer (c) in addition to the aforementioned constitutional units derived from the components (a) and (b).

(Contents of Respective Components in Monomer Mixture or Contents of Respective Constitutional Units in Polymer)

The contents of the aforementioned respective components in the monomer mixture (contents of non-neutralized components; hereinafter defined in the same way) upon production of the carboxy group-containing polymer, or the contents of the constitutional units derived from the respective components in the carboxy group-containing polymer are as follows, from the viewpoint of improving dispersion stability of the pigment-containing crosslinked polymer particles in the resulting water-based ink.

The content of the carboxylic acid monomer (a) is preferably not less than 10% by mass, more preferably not less than 15% by mass and even more preferably not less than 25% by mass, and is also preferably not more than 60% by mass, more preferably not more than 50% by mass and even more preferably not more than 40% by mass.

The content of the hydrophobic monomer (b) is preferably not less than 20% by mass, more preferably not less than 40% by mass and even more preferably not less than 50% by mass, and is also preferably not more than 90% by mass, more preferably not more than 80% by mass and even more preferably not more than 75% by mass.

(Production of Carboxy Group-Containing Polymer)

The carboxy group-containing polymer may be produced by copolymerizing the aforementioned monomer mixture by conventionally known polymerization methods such as a bulk polymerization method, a solution polymerization method, a suspension polymerization method and an emulsion polymerization method. Among these polymerization methods, preferred is the solution polymerization method.

The solvent used in the solution polymerization method is not particularly limited, and is preferably an organic polar solvent. The organic polar solvent that is miscible with water may be used in the form of a mixture with water. Examples of the organic polar solvent include aliphatic alcohols having 1 to 3 carbon atoms; ketones having 3 to 8 carbon atoms; ethers; and esters such as ethyl acetate. Among these organic polar solvents, preferred is methanol, ethanol, acetone, methyl ethyl ketone, or a mixed solvent of at least one solvent selected from the group consisting of these solvents, and water, and more preferred is methyl ethyl ketone or a mixed solvent of methyl ethyl ketone and water.

The polymerization may be carried out in the presence of a polymerization initiator or a chain transfer agent.

Examples of the polymerization initiator include conventionally known radical polymerization initiators, e.g., azo compounds such as 2,2'-azobisisobutyronitrile and 2,2'-azobis(2,4-dimethylvaleronitrile), and organic peroxides such as t-butyl peroxyoctoate and benzoyl peroxide. The amount of the radical polymerization initiator used in the polymerization is preferably from 0.001 to 5 mol and more preferably from 0.01 to 2 mol per 1 mol of the monomer mixture.

Examples of the chain transfer agent usable in the present invention include conventionally known chain transfer agents, e.g., mercaptans such as octyl mercaptan and 2-mercaptoethanol, and thiuram disulfides.

In addition, the type of a polymerization chain of the monomer polymerized is not particularly limited, and may be of any of a random type, a block type and a graft type, etc.

The preferred polymerization conditions may vary depending upon the kinds of polymerization initiators, monomers and solvents used, etc. In general, the polymerization temperature is preferably not lower than 30° C. and more preferably not lower than 50° C., and is also preferably not higher than 95° C. and more preferably not higher than 80° C. The polymerization time is preferably not less than 1 hour and more preferably not less than 2 hours, and is also preferably not more than 20 hours and more preferably not more than 10 hours. Furthermore, the polymerization is preferably conducted in a nitrogen gas atmosphere or an atmosphere of an inert gas such as argon.

After completion of the polymerization reaction, the polymer produced may be isolated from the obtained reaction solution by conventionally known methods such as reprecipitation and removal of the solvent by distillation. In addition, the resulting polymer may be purified by removing the unreacted monomers, etc., from the reaction solution by reprecipitation, membrane separation, chromatography, extraction, etc.

In the present invention, as the method of dispersing the pigment using the carboxy group-containing polymer, any optional conventionally known methods may be used. However, the method including the below-mentioned steps I and II which is capable of obtaining a water dispersion of the pigment-containing polymer particles is preferably adopted. From the viewpoint of enhancing productivity of the water dispersion of the pigment-containing polymer particles, the obtained reaction solution is preferably used as such in the form of a carboxy group-containing polymer solution without removing the organic solvent used in the aforementioned polymerization reaction for production of the carboxy group-containing polymer therefrom in order to use the organic solvent contained therein as an organic solvent used in the below-mentioned step I.

The solid content of the carboxy group-containing polymer solution is preferably not less than 30% by mass and more preferably not less than 40% by mass, and is also preferably not more than 70% by mass and more preferably not more than 65% by mass, from the viewpoint of enhancing productivity of the water dispersion of the pigment-containing polymer particles.

The number-average molecular weight of the carboxy group-containing polymer used in the present invention is preferably not less than 2,000 and more preferably not less than 5,000, and is also preferably not more than 20,000 and more preferably not more than 18,000. In addition, the weight-average molecular weight of the carboxy group-containing polymer is preferably not less than 6,000 and more preferably not less than 8,000, and is also preferably not more than 80,000 and more preferably not more than 40,000. When these molecular weights of the carboxy group-containing polymer lie within the aforementioned ranges, the carboxy group-containing polymer has sufficient adsorption to the pigment, and the resulting dispersion can exhibit good dispersion stability.

Meanwhile, the aforementioned average molecular weight may be measured by the method described in Examples below.

[Production of Pigment-Containing Water-Insoluble Crosslinked Polymer Particles (A)]

The water-insoluble crosslinked polymer particles (A) containing the pigment (pigment-containing crosslinked polymer particles) can be efficiently produced in the form of a water dispersion thereof by the process including the following steps I to III.

Step I: subjecting a mixture containing the carboxy group-containing polymer, an organic solvent, the pigment and water (hereinafter also referred to as a "pigment mixture") to dispersion treatment to obtain a dispersion of polymer particles containing the pigment (hereinafter also referred to merely as "pigment-containing polymer particles");

Step II: removing the aforementioned organic solvent from the dispersion obtained in the step I to obtain a water dispersion of the pigment-containing polymer particles (hereinafter also referred to merely as a "pigment water dispersion"); and Step III: subjecting the pigment water dispersion obtained in the step II to crosslinking treatment with an epoxy compound to obtain a water-based pigment dispersion containing pigment-containing crosslinked polymer particles formed by crosslinking the carboxy group-containing polymer with the epoxy compound.

(Step I)

In the step I, there is preferably used such a method in which the carboxy group-containing polymer is first dissolved in the organic solvent, and then the pigment and water, if required together with a neutralizing agent, a surfactant and the like, are added and mixed in the resulting carboxy group-containing polymer solution to obtain a dispersion of an oil-in-water type. The order of addition of the respective components added to the carboxy group-containing polymer solution is not particularly limited, and it is preferred that water, the neutralizing agent and the pigment are successively added to the carboxy group-containing polymer solution in this order.

The organic solvent in which the carboxy group-containing polymer can be dissolved is not particularly limited, and is preferably selected from aliphatic alcohols having 1 to 3 carbon atoms, ketones, ethers, esters and the like. Of these organic solvents, from the viewpoint of improving wettability to the pigment, solubility of the carboxy group-containing polymer and adsorption of the carboxy group-containing polymer onto the pigment, more preferred are ketones having not less than 4 and not more than 8 carbon atoms, even more preferred are methyl ethyl ketone and methyl isobutyl ketone, and further even more preferred is methyl ethyl ketone.

When the carboxy group-containing polymer is synthesized by the solution polymerization method, the solvent used in the solution polymerization method may be directly used as such in the step I.

(Neutralization)

The carboxyl groups contained in the carboxy group-containing polymer may be at least partially neutralized using a neutralizing agent. When neutralizing the carboxy group-containing polymer, the pH value of the carboxy group-containing polymer neutralized is preferably controlled to not less than 7 and not more than 11, In addition, in the case where the crosslinking polymer is a polymer that becomes water-soluble by the neutralization, from the viewpoint of obtaining the water dispersion of the pigment-containing polymer particles, the step I is preferably conducted under such a condition that the crosslinking polymer is held in a water-insoluble state by controlling an amount of the neutralizing agent used.

As the neutralizing agent, there may be used basic compounds such as alkali metal hydroxides and organic amines. From the viewpoint of improving storage stability, ejection properties, fixing properties and the like of the resulting water-based pigment dispersion and water-based ink, the alkali metal hydroxides are preferably used as the neutralizing agent.

Specific examples of the alkali metal hydroxides include lithium hydroxide, sodium hydroxide, potassium hydroxide and cesium hydroxide. Of these alkali metal hydroxides, preferred are sodium hydroxide and potassium hydroxide. Specific examples of the organic amines include ammonia, dimethylaminoethanol, triethanolamine, etc. Also, the carboxy group-containing polymer may be previously neutralized.

The neutralizing agent is preferably used in the form of an aqueous neutralizing agent solution from the viewpoint of sufficiently and uniformly accelerating the neutralization of the carboxy group-containing polymer. From the same viewpoint as described above, the concentration of the aqueous neutralizing agent solution is preferably not less than 3% by mass, more preferably not less than 10% by mass and even more preferably not less than 15% by mass, and is also preferably not more than 50% by mass and more preferably not more than 25% by mass.

The neutralization degree of the carboxy groups of the carboxy group-containing polymer is preferably not less than 10 mol %, more preferably not less than 15 mol %, even more preferably not less than 20 mol % and further even more preferably not less than 25 mol %, and is also preferably not more than 60 mol %, more preferably not more than 55 mol %, even more preferably not more than 50 mol % and further even more preferably not more than 45 mol %, from the viewpoint of improving water resistance, storage stability, fixing properties, etc., of the resulting water-based pigment dispersion and water-based ink.

The neutralization degree as used herein means the value calculated by dividing a mole equivalent number of the neutralizing agent (alkali metal hydroxide) by a mole equivalent number of the carboxy groups of the carboxy group-containing polymer, i.e., the value expressed by the ratio of [(mole equivalent number of neutralizing agent)/ (mole equivalent number of carboxy groups of carboxy group-containing polymer)]. The neutralization degree basically does not exceed 100 mol %. However, since the neutralization degree defined in the present invention is calculated from the mole equivalent number of the alkali metal hydroxide used, the neutralization degree will exceed 100 mol % if the alkali metal hydroxide is used in an excessively large amount.

(Contents of Respective Components in Pigment Mixture)

The contents of the respective components in the pigment mixture are as follows from the viewpoint of improving water resistance, storage stability, fixing properties and ejection properties of the resulting water-based pigment dispersion as well as from the viewpoint of enhancing productivity of the water-based pigment dispersion.

The content of the pigment in the pigment mixture used in the step I is preferably not less than 5% by mass, more preferably not less than 10% by mass and even more preferably not less than 12.5% by mass, and is also preferably not more than 30% by mass, more preferably not more than 25% by mass and even more preferably not more than 20% by mass.

The content of the carboxy group-containing polymer in the pigment mixture is preferably not less than 1.0% by mass, more preferably not less than 2.0% by mass and even more preferably not less than 3.0% by mass, and is also preferably not more than 8.0% by mass, more preferably not more than 7.0% by mass and even more preferably not more than 6.0% by mass.

The content of the organic solvent in the pigment mixture is preferably not less than 5% by mass, more preferably not less than 7% by mass and even more preferably not less than 10% by mass, and is also preferably not more than 35% by mass, more preferably not more than 30% by mass and even more preferably not more than 25% by mass.

The content of water in the pigment mixture is preferably not less than 40% by mass, more preferably not less than 45% by mass and even more preferably not less than 50% by mass, and is also preferably not more than 85% by mass, more preferably not more than 80% by mass and even more preferably not more than 75% by mass.

The mass ratio of the pigment to the carboxy group-containing polymer [pigment/carboxy group-containing polymer] in the pigment mixture is preferably not less than 30/70, more preferably not less than 40/60 and even more preferably not less than 50/50, and is also preferably not more than 90/10, more preferably not more than 80/20 and even more preferably not more than 75/25, from the viewpoint of improving water resistance, storage stability, fixing properties, etc., of the resulting water-based pigment dispersion.

(Dispersion Treatment of Pigment Mixture)

In the step I, the aforementioned pigment mixture is subjected to dispersion treatment to obtain a dispersion of the pigment-containing polymer particles. The dispersing method for obtaining the dispersion of the pigment-containing polymer particles is not particularly limited. The pigment particles may be atomized into fine particles having a desired average particle size only by substantial dispersion treatment. However, it is preferred that the pigment mixture is first subjected to preliminary dispersion treatment, and then further subjected to the substantial dispersion treatment by applying a shear stress thereto so as to control the average particle size of the obtained pigment particles to a desired value.

The temperature used in the step I, in particular, the temperature used in the preliminary dispersion treatment in the step I, is preferably not lower than 0° C., and is also preferably not higher than 40° C., more preferably not higher than 30° C. and even more preferably not higher than 25° C. The dispersing time is preferably not less than 0.5 hour and more preferably not less than 0.8 hour, and is also preferably not more than 30 hours, more preferably not more than 10 hours and even more preferably not more than 5 hours.

When subjecting the pigment mixture to the preliminary dispersion treatment, there may be used ordinary mixing and stirring devices such as anchor blades and disper blades. Of these devices, preferred are high-speed stirring mixers.

As a means for applying a shear stress to the pigment mixture in the substantial dispersion treatment, there may be used, for example, kneading machines such as roll mills and kneaders, high-pressure homogenizers such as "MICRO-FLUIDIZER" available from Microfluidics Corporation, and media-type dispersers such as paint shakers and beads mills. Examples of the commercially available media-type dispersers include "Ultra Apex Mill" available from Kotobuki Industries Co., Ltd., and "Pico Mill" available from Asada Iron Works Co., Ltd. These devices may be used in combination of any two or more thereof. Among these devices, the high-pressure homogenizers are preferably used from the viewpoint of reducing a particle size of the pigment.

In the case where the substantial dispersion treatment is conducted using the high-pressure homogenizer, the particle size of the pigment can be adjusted to a desired value by controlling the treating pressure and the number of passes through the homogenizer used in the substantial dispersion treatment.

The treating pressure used in the substantial dispersion treatment is preferably not less than 60 MPa, more preferably not less than 100 MPa and even more preferably not less than 130 MPa, and is also preferably not more than 200 MPa and more preferably not more than 180 MPa, from the viewpoint of enhancing productivity of the dispersion and cost efficiency.

Also, the number of passes through the homogenizer used in the substantial dispersion treatment is preferably not less than 3 and more preferably not less than 10, and is also preferably not more than 30 and more preferably not more than 25.

(Step II)

In the step II, by removing the organic solvent from the dispersion obtained in the step I by any conventionally known methods, it is possible to obtain a water dispersion of the pigment-containing polymer particles (pigment water dispersion). The organic solvent is preferably substantially completely removed from the thus obtained pigment water dispersion. However, the residual organic solvent may be present in the pigment water dispersion unless the objects and effects of the present invention are adversely affected by the residual organic solvent. The content of the residual organic solvent in the pigment water dispersion is preferably not more than 0.1% by mass and more preferably not more than 0.01% by mass.

In addition, if required, the dispersion may be subjected to heating and stirring treatments before removing the organic solvent therefrom by distillation.

In the thus-obtained pigment water dispersion, the pigment-containing polymer particles are dispersed in a medium containing water as a main medium. The configuration of the pigment-containing polymer particles in the pigment water dispersion is not particularly limited, and the pigment-containing polymer particles may have any configuration as long as the particles are formed of at least the pigment and the carboxy group-containing polymer. Examples of the configuration of the pigment-containing polymer particles include the particle configuration in which the pigment is enclosed or encapsulated in the carboxy group-containing polymer, the particle configuration in which the pigment is uniformly dispersed in the carboxy group-containing polymer, and the particle configuration in which the pigment is exposed onto a surface of the respective carboxy group-containing polymer particles, as well as a mixed configuration of these particle configurations.

The concentration of non-volatile components in the resulting pigment water dispersion (solid content of the pigment water dispersion) is preferably not less than 10% by mass and more preferably not less than 15% by mass, and is also preferably not more than 30% by mass and more preferably not more than 25% by mass, from the viewpoint of improving dispersion stability of the pigment water dispersion as well as from the viewpoint of facilitating preparation of the water-based ink.

Meanwhile, the solid content of the pigment water dispersion may be measured by the method described in Examples below.

The average particle size of the pigment-containing polymer particles in the pigment water dispersion is preferably not less than 50 nm, more preferably not less than 60 nm and even more preferably not less than 80 nm, and is also preferably not more than 200 nm, more preferably not more than 160 nm and even more preferably not more than 140 nm, from the viewpoint of suppressing formation of coarse particles as well as from the viewpoint of improving ejection stability of the resulting water-based ink.

Meanwhile, the average particle size of the pigment-containing polymer particles may be measured by the method described in Examples below.

(Step III)

In the step III, from the viewpoint of improving water resistance, storage stability and ejection properties of the resulting water-based pigment dispersion and water-based ink, the pigment water dispersion obtained in the step II is subjected to crosslinking treatment with an epoxy compound (crosslinking agent) to obtain a water-based pigment dispersion containing the pigment-containing crosslinked polymer particles formed by crosslinking the carboxy group-containing polymer with the epoxy compound.

In this step, the carboxy groups contained in the polymer constituting the pigment-containing polymer particles are partially crosslinked to form a crosslinked structure on a surface layer portion of the respective pigment-containing polymer particles. As a result, the carboxy group-containing polymer that is contained in the pigment-containing polymer particles dispersed in the pigment water dispersion is crosslinked with the crosslinking agent and formed into the water-insoluble crosslinked polymer.

In this case, it is preferred that the pigment water dispersion obtained in the aforementioned step II is mixed with the epoxy compound to subject the pigment water dispersion to crosslinking treatment with the epoxy compound, thereby obtaining the water-based pigment dispersion. By conducting such a procedure, it is possible to obtain the water-based pigment dispersion in the form of such a dispersion that particles formed by coating the pigment with the water-insoluble crosslinked polymer are dispersed in an aqueous medium.

(Epoxy Compound)

The solubility in water of the epoxy compound used in the present invention as measured by dissolving the epoxy compound in 100 g of water at 20° C. is preferably not more than 50 g, more preferably not more than 40 g and even more preferably not more than 35 g from the viewpoint of allowing the epoxy compound to efficiently react with the carboxy groups contained in the carboxy group-containing polymer in the medium containing water as a main component.

In addition, from the viewpoint of improving water resistance, storage stability, ejection properties and fixing properties of the resulting water-based pigment dispersion and water-based ink, the epoxy compound is preferably in the form of a polyfunctional epoxy compound and more preferably in the form of a water-insoluble polyfunctional epoxy compound. In addition, the water solubility rate of the water-insoluble polyfunctional epoxy compound is preferably not more than 50%, more preferably not more than 45% and even more preferably not more than 40%.

The "water solubility rate (% by mass)" as used herein means a rate (% by mass) of dissolution of the epoxy compound as measured by dissolving 10 parts by mass of the epoxy compound in 90 parts by mass of water at room temperature (25° C.). More specifically, the water solubility rate of the epoxy compound may be measured by the method described in Examples below.

The polyfunctional epoxy compound is preferably a compound containing two or more epoxy groups in a molecule thereof, more preferably a glycidyl ether group-containing compound, and even more preferably a glycidyl ether compound of a polyhydric alcohol containing a hydrocarbon group having not less than 3 and not more than 8 carbon atoms.

The molecular weight of the epoxy compound, in particular, the water-insoluble polyfunctional epoxy compound, is preferably not less than 120, more preferably not less than 150 and even more preferably not less than 200, and is also preferably not more than 2000, more preferably not more than 1500 and even more preferably not more than 1000, from the viewpoint of facilitating the crosslinking reaction and improving storage stability of the resulting crosslinked polymer.

The number of epoxy groups contained per one molecule of the polyfunctional epoxy compound is not less than 2 and preferably not less than 3, and is also preferably not more than 6 from the viewpoint of allowing the epoxy compound to efficiently react with the carboxy groups of the polymer to enhance storage stability, etc., of the resulting pigment-containing crosslinked polymer particles, and more preferably not more than 4 from the viewpoint of improving market availability.

Specific examples of the polyfunctional epoxy compound include polyglycidyl ethers such as polypropylene glycol diglycidyl ether (water solubility rate: 31% by mass), glycerin polyglycidyl ether, glycerol polyglycidyl ether, polyglycerol polyglycidyl ether, trimethylolpropane polyglycidyl ether (water solubility rate: 27% by mass), 1,6-hexanediol diglycidyl ether (water solubility rate: 36% by mass), sorbitol polyglycidyl ether, pentaerythritol polyglycidyl ether, resorcinol diglycidyl ether, neopentyl glycol diglycidyl ether and hydrogenated bisphenol A-type diglycidyl ethers.

Of these polyfunctional epoxy compounds, preferred is at least one water-insoluble polyfunctional epoxy compound selected from the group consisting of trimethylolpropane polyglycidyl ether (water solubility rate: 27% by mass), 1,6-hexanediol diglycidyl ether (water solubility rate: 36% by mass) and pentaerythritol polyglycidyl ether (water-insoluble; water solubility rate: 0% by mass).

The reaction between the epoxy compound and the carboxy groups of the carboxy group-containing polymer is preferably carried out after dispersing the pigment using the carboxy group-containing polymer. From the viewpoint of completing the crosslinking reaction and improving cost efficiency, the reaction temperature is preferably not lower than 40° C., more preferably not lower than 50° C., even more preferably not lower than 55° C., further even more preferably not lower than 60° C. and still further even more preferably not lower than 70° C., and is also preferably not higher than 95° C. and more preferably not higher than 90° C.

In addition, from the same viewpoint as described above, the reaction time is preferably not less than 0.5 hour, more preferably not less than 1 hour, even more preferably not less than 1.5 hours and further even more preferably not less than 3.0 hours, and is also preferably not more than 12 hours, more preferably not more than 10 hours, even more preferably not more than 8.0 hours and further even more preferably not more than 5 hours.

The crosslinking degree of the water-insoluble crosslinked polymer obtained after the crosslinking reaction is preferably not less than 20 mol %, more preferably not less than 25 mol % and even more preferably not less than 30 mol %, and is also preferably not more than 80 mol %, more preferably not more than 70 mol % and even more preferably not more than 60 mol %.

The crosslinking degree of the water-insoluble crosslinked polymer is an apparent crosslinking degree calculated from an acid value of the polymer and an equivalent amount of the epoxy groups of the crosslinking agent, i.e., is expressed by the ratio of a mole equivalent number of the epoxy groups of the epoxy compound to a mole equivalent number of the carboxy groups of the polymer [(mole equivalent number of epoxy groups of epoxy compound)/(mole equivalent number of carboxy groups of polymer)].

The acid value of the water-insoluble crosslinked polymer obtained after the crosslinking reaction is preferably not less than 80 mgKOH/g, more preferably not less than 100 mgKOH/g and even more preferably not less than 105 mgKOH/g, and is also preferably not more than 180 mgKOH/g, more preferably not more than 160 mgKOH/g and even more preferably not more than 140 mgKOH/g.

The average particle size of the pigment-containing crosslinked polymer particles contained in the water-based pigment dispersion is preferably not less than 60 nm, more preferably not less than 70 nm and even more preferably not less than 80 nm, and is also preferably not more than 200 nm, more preferably not more than 160 nm and even more preferably not more than 150 nm, from the viewpoint of suppressing formation of coarse particles as well as from the viewpoint of improving ejection stability of the resulting water-based ink.

Meanwhile, the average particle size of the pigment-containing crosslinked polymer particles may be measured by the method described in Examples below.

In addition, the average particle size of the pigment-containing crosslinked polymer particles in the water-based ink is the same as the aforementioned average particle size of the pigment-containing crosslinked polymer particles in the water-based pigment dispersion, and the preferred ranges of the average particle size of the pigment-containing crosslinked polymer particles in the water-based ink are also the same as the preferred ranges of the average particle size of the pigment-containing crosslinked polymer particles in water-based pigment dispersion.

<Polymer Emulsion (B)>

The polymer emulsion (B) is used in order to improve smoothness of a surface of a printing medium on which characters or images are printed, by filling voids of irregularities formed thereon in association with drying of the water-based ink, and thereby enhance fastness of the printed characters or images.

The polymer constituting the polymer emulsion (B) contains a constitutional unit derived from a carboxylic acid monomer (a) and a constitutional unit derived from a hydrophobic monomer (b).

The aforementioned polymer may further contain a constitutional unit derived from a nonionic monomer (c) as well as a constitutional unit derived from a polyfunctional monomer having two or more polymerizable double bonds.

Specific examples and preferred examples of the aforementioned components (a) to (c) are the same as those described previously in the column concerning the aforementioned carboxylic acid polymer.

Specific examples of the polyfunctional monomer include diacrylate compounds such as polyethylene glycol diacrylate, triethylene glycol diacrylate, 1,3-butylene glycol diacrylate, 1,6-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane and 2,2'-bis(4-acryloxydiethoxyphenyl)propane, dimethacrylate compounds, triacrylate compounds, trimethacrylate compounds, tetraacrylate compounds, hexaacrylate compounds, methylenebisacrylamide and divinyl benzene.

The acid value of the polymer constituting the polymer emulsion (B) is preferably not less than 5 mgKOH/g, more preferably not less than 15 mgKOH/g, even more preferably not less than 50 mgKOH/g and further even more preferably not less than 80 mgKOH/g, and is also preferably not more than 250 mgKOH/g, more preferably not more than 200 mgKOH/g and even more preferably not more than 180 mgKOH/g, from the viewpoint of improving optical density of the water-based ink and fastness of the printed characters or images.

The polymer constituting the polymer emulsion (B) is preferably in the form of a crosslinked polymer from the viewpoint of improving ejection stability of the water-based ink.

Examples of the crosslinked polymer include polymers obtained by polymerizing a monomer including the aforementioned polyfunctional monomer, and polymers obtained by crosslinking an uncrosslinked polymer with a crosslinking agent. Among these crosslinked polymers, preferred are the polymers obtained by crosslinking an uncrosslinked polymer with a crosslinking agent.

The crosslinked polymer is thus in the form of the polymer obtained by crosslinking reaction using the crosslinking agent. The crosslinking agent is preferably an epoxy compound, more preferably a polyfunctional epoxy compound, even more preferably a water-insoluble polyfunctional epoxy compound and further even more preferably a glycidyl ether compound of a polyhydric alcohol containing a hydrocarbon group having not less than 3 and not more than 8 carbon atoms.

The crosslinking agent (epoxy compound) which may be used in the present invention as well as conditions of the crosslinking reaction are the same as those described previously in the column concerning the aforementioned epoxy compound.

In addition, from the viewpoint of suppressing flocculation of the pigment in the water-based pigment dispersion, it is preferred that the crosslinking reaction for production of the polymer emulsion (B) is not conducted simultaneously with the crosslinking reaction for production of the water-insoluble crosslinked polymer particles (A). More specifically, it is preferred that the crosslinking reaction for production of the polymer emulsion (B) is conducted in a reaction system containing no pigment. This is because if the crosslinking reaction is conducted in a reaction system containing both of the water-based pigment dispersion and the polymer emulsion (B), the balance of electrostatic repulsion force between the particles dispersed in the reaction system tends to vary undesirably in an early stage of the crosslinking reaction, so that the pigment in the water-based pigment dispersion tends to suffer from flocculation thereof.

The polymer constituting the polymer emulsion (B) may be produced by conventionally known polymerization methods such as a bulk polymerization method, a solution polymerization method, a suspension polymerization method and an emulsion polymerization method. Among these polymerization methods, preferred is the emulsion polymerization method. The polymerization initiator, emulsifier and molecular weight controller used upon conducting the emulsion polymerization may be appropriately selected and used according to ordinary methods.

The polymerization initiator may be the same as those used in ordinary radical polymerization. Examples of the polymerization initiator include potassium persulfate, ammonium persulfate, hydrogen peroxide, azobisisobutyronitrile, benzoyl peroxide, dibutyl peroxide, peracetic acid, cumene hydroperoxide, t-butyl hydroxyperoxide, p-menthane hydroxyperoxide, etc. In particular, as described above, when the polymerization reaction is conducted in water, a water-soluble polymerization initiator is preferably used.

Examples of the emulsifier include sodium lauryl sulfate, those emulsifiers generally used as an anionic surfactant, a nonionic surfactant or an ampholytic surfactant, as well as a mixture of these emulsifiers. These emulsifiers may be used alone or in the form of a mixture of any two or more thereof.

In the case where the polymer emulsion (B) is produced by the emulsion polymerization method, the pH value of the reaction solution tends to incline to an acid side owing to the carboxy groups being present in the surface of the respective polymer particles, so that the reaction solution tends to suffer from increase in viscosity or flocculation. To solve these problems, the reaction solution is neutralized with a basic substance. Examples of the basic substance used in the neutralization include ammonia, organic amines, inorganic hydroxides, etc. Among these basic substances, from the viewpoint of improving long-term storage stability and ejection stability of the polymer emulsion and the resulting water-based ink, preferred are monovalent inorganic hydroxides such as potassium hydroxide, sodium hydroxide and lithium hydroxide. The amount of the aforementioned neutralizing agent added may be appropriately determined such that the pH value of the resulting polymer emulsion is in the range of from 7.5 to 9.5 and preferably from 7.5 to 8.5.

From the viewpoint of completing the reaction and improving cost efficiency, the reaction temperature used in the emulsion polymerization is preferably not lower than 40° C., more preferably not lower than 50° C., even more preferably not lower than 55° C., further even more preferably not lower than 60° C. and still further even more preferably not lower than 70° C., and is also preferably not higher than 95° C. and more preferably not higher than 90° C. In addition, from the same viewpoint as described above, the reaction time used in the emulsion polymerization is preferably not less than 0.5 hour, more preferably not less than 1 hour, even more preferably not less than 1.5 hours and further even more preferably not less than 3.0 hours, and is also preferably not more than 12 hours, more preferably not more than 10 hours, even more preferably not more than 8.0 hours and further even more preferably not more than 5 hours.

The crosslinking degree of the polymer constituting the polymer emulsion (B) is preferably not less than 5 mol %, more preferably not less than 10 mol % and even more preferably not less than 15 mol %, and is also preferably not more than 80 mol %, more preferably not more than 70 mol % and even more preferably not more than 60 mol %.

The crosslinking degree of the polymer constituting the polymer emulsion (B) is an apparent crosslinking degree calculated from an acid value of the polymer and an equivalent amount of the epoxy groups of the crosslinking agent, i.e., is expressed by the ratio of a mole equivalent number of the epoxy groups of the epoxy compound to a mole equivalent number of the carboxy groups of the crosslinking polymer [(mole equivalent number of epoxy groups of epoxy compound)/(mole equivalent number of carboxy groups of crosslinking polymer)].

The acid value of the crosslinking polymer constituting the polymer emulsion (B) before the crosslinking reaction is preferably not less than 10 mgKOH/g, more preferably not less than 15 mgKOH/g, even more preferably not less than 50 mgKOH/g and further even more preferably not less than 80 mgKOH/g, and is also preferably not more than 300 mgKOH/g, more preferably not more than 280 mgKOH/g and even more preferably not more than 250 mgKOH/g, from the viewpoint of enhancing optical density of the resulting water-based ink and improving fastness of the printed characters or images.

The acid value of the crosslinked polymer constituting the polymer emulsion (B) obtained after the crosslinking reaction, is preferably not less than 8 mgKOH/g, more preferably not less than 10 mgKOH/g and even more preferably not less than 50 mgKOH/g, and is also preferably not more than 250 mgKOH/g, more preferably not more than 200 mgKOH/g and even more preferably not more than 180 mgKOH/g.

The average particle size of the polymer particles in the polymer emulsion (B) is preferably not less than 20 nm, more preferably not less than 40 nm and even more preferably not less than 50 nm, and is also preferably not more than 200 nm, more preferably not more than 150 nm and even more preferably not more than 110 nm, from the viewpoint of improving storage stability and ejection stability of the resulting water-based ink.

Meanwhile, the average particle size of the polymer particles may be measured by the method described in Examples below.

[Method for Producing Water-Based Ink]

The water-based ink of the present invention may be efficiently produced by mixing the water-based pigment dispersion containing the pigment-containing crosslinked polymer particles obtained in the aforementioned step III, the aforementioned polymer emulsion (B), an organic solvent and water, if required together with various additives such as a surfactant.

The method of mixing the aforementioned respective components is not particularly limited.

The organic solvent is used from the viewpoint of improving storage stability, etc., of the water-based ink. The organic solvent used in the water-based ink preferably includes one or more organic solvents having a boiling point of not lower than 90° C., and it is also preferred that a weighted mean value of boiling points of the organic solvents is not higher than 250° C. The weighted mean value of boiling points of the organic solvents is preferably not lower than 150° C. and more preferably not lower than not lower than 180° C., and is also preferably not higher than 240° C., more preferably not higher than 220° C. and even more preferably not higher than 200° C.

Specific examples of the organic solvents used in the water-based ink include polyhydric alcohols, polyhydric alcohol alkyl ethers, nitrogen-containing heterocyclic compounds, amides, amines, sulfur-containing compounds, etc. Of these organic solvents, preferred is at least one organic solvent selected from the group consisting of polyhydric alcohols and polyhydric alcohol alkyl ethers, more preferred is at least one organic solvent selected from the group consisting of ethylene glycol, propylene glycol, diethylene glycol, triethylene glycol, polyethylene glycol, glycerin, trimethylolpropane and diethylene glycol diethyl ether, and even more preferred is at least one organic solvent selected from the group consisting of propylene glycol, glycerin, triethylene glycol and trimethylolpropane.

Examples of the surfactant used in the water-based ink include a nonionic surfactant, an anionic surfactant, an ampholytic surfactant, a silicone-based surfactant, a fluorine-based surfactant, etc. Among these surfactants, preferred is a nonionic surfactant.

Examples of the other additives that may be usually used in the method for producing the water-based ink include a humectant, a wetting agent, a penetrant, a viscosity controller, a defoaming agent, an antiseptic agent, a mildew-proof agent and a rust preventive.

The contents of the respective components in the water-based ink obtained by the aforementioned production method as well as properties of the water-based ink produced are as follows.

(Content of Pigment)

The content of the pigment in the water-based ink is preferably not less than 1% by mass, more preferably not less than 3% by mass and even more preferably not less than 4.5% by mass from the viewpoint of enhancing optical density of the water-based ink upon printing. Also, the content of the pigment in the water-based ink is preferably not more than 15% by mass, more preferably not more than 10% by mass and even more preferably not more than 8% by mass from the viewpoint of improving ejection stability and storage stability of the water-based ink.

(Content of Pigment-Containing Water-Insoluble Crosslinked Polymer Particles (A))

The content of the pigment-containing water-insoluble crosslinked polymer particles (A) in the water-based ink as calculated in terms of a total content of the pigment and the water-insoluble crosslinked polymer in the water-based ink is preferably not less than 2% by mass, more preferably not less than 4% by mass, even more preferably not less than 5% by mass and further even more preferably not less than 6% by mass, and is also preferably not more than 17% by mass, more preferably not more than 12% by mass and even more preferably not more than 10% by mass.

(Content of Polymer Emulsion (B))

The content of the polymer emulsion (B) in the water-based ink may be appropriately determined in consideration of fixing properties, etc., of the resulting water-based ink. The content of the polymer emulsion (B) in the water-based ink in terms of solid components contained in the polymer emulsion (B) is preferably not less than 1% by mass, more preferably not less than 2.5% by mass and even more preferably not less than 3.5% by mass, and is also preferably not more than 10% by mass, more preferably not more than 8% by mass and even more preferably not more than 6.5% by mass.

The mass ratio of the pigment to the polymer particles in the polymer emulsion (B) (as solid components contained in the polymer emulsion (B)) (pigment/polymer particles) in the water-based ink is preferably from 10/1 to 1/1, more preferably from 7/1 to 2/1 and even more preferably from 5/1 to 2/1 from the viewpoint of improving fastness of the printed characters or images.

The mass ratio of the pigment-containing water-insoluble crosslinked polymer particles (A) to the polymer particles in the polymer emulsion (B) (as solid components contained in the polymer emulsion (B)) [pigment-containing water-insoluble crosslinked polymer particles (A)/polymer particles] in the water-based ink is preferably from 10/1 to 0.3/1, more preferably from 6/1 to 0.5/1 and even more preferably from 4/1 to 1/1 from the viewpoint of improving fastness of the printed characters or images.

(Content of Organic Solvent)

The content of the organic solvent in the water-based ink is preferably not less than 5% by mass, more preferably not less than 10% by mass, even more preferably not less than 15% by mass and further even more preferably not less than 20% by mass, and is also preferably not more than 60% by mass, more preferably not more than 50% by mass, even more preferably not more than 40% by mass and further even more preferably not more than 35% by mass, from the viewpoint of improving ejection stability of the water-based ink.

(Content of Water)

The content of water in the water-based ink is preferably not less than 20% by mass, more preferably not less than 35% by mass and even more preferably not less than 45% by mass, and is also preferably not more than 85% by mass, more preferably not more than 75% by mass and even more preferably not more than 65% by mass, from the viewpoint of improving ejection stability of the water-based ink.

(Properties of Water-Based Ink)

The viscosity of the water-based ink as measured at 32° C. is preferably not less than 2.0 mPa·s, more preferably not less than 3.0 mPa·s and even more preferably not less than 5.0 mPa·s, and is also preferably not more than 12 mPa·s, more preferably not more than 9.0 mPa·s and even more preferably not more than 7.0 mPa·s, from the viewpoint of improving storage stability of the water-based ink.

The pH value of the water-based ink is preferably not less than 7.0, more preferably not less than 7.2 and even more preferably not less than 7.5 from the viewpoint of improving storage stability of the water-based ink, and is also preferably not more than 11.0, more preferably not more than 10.0 and even more preferably 9.5 from the viewpoint of improving resistance of members to the water-based ink and suppressing skin irritation.

[Ink-Jet Printing Method]

The water-based ink according to the present invention may be loaded to a conventionally known ink-jet printing apparatus to eject droplets of the ink onto a printing medium to thereby print characters or images having excellent fastness, etc., on the printing medium.

The ink-jet printing apparatus may be in the form of either a thermal-type ink-jet printer or a piezoelectric-type ink-jet printer. The water-based ink according to the present invention is preferably used as a water-based ink for ink-jet printing using the piezoelectric-type ink-jet printer.

The inside temperature of a print head in the ink-jet printing apparatus upon conducting the ink-jet printing is preferably not lower than 20° C., more preferably not lower than 25° C. and even more preferably not lower than 30° C., and is also preferably not higher than 45° C., more preferably not higher than 40° C. and even more preferably not higher than 38° C., from the viewpoint of reducing viscosity of the water-based ink.

The temperature of a surface of the printing medium which is opposed to an ink ejection region of the print head in the ink-jet printing apparatus is preferably adjusted to not lower than 28° C., more preferably not lower than 30° C. and even more preferably not lower than 31° C., and is also preferably adjusted to not higher than 45° C., more preferably not higher than 40° C. and even more preferably not higher than 38° C. In the case where the printing medium is subjected to no heating/cooling treatments, it is preferred that the ambient temperature upon ink-jet printing is controlled to the aforementioned temperature range.

Examples of the printing medium usable in the present invention include a high-water absorbing plain paper, a low-water absorbing coated paper and a film. Specific examples of the coated paper include a versatile glossy coated paper, a multi-color foam glossy coated paper, etc. Specific examples of the film include a polyester film, a polyvinyl chloride film, a polypropylene film, a polyethylene film, etc.

EXAMPLES

In the following Production Examples, Examples and Comparative Examples, the "part(s)" and "%" indicate "part(s) by mass" and "% by mass", respectively, unless otherwise specified.

(1) Measurement of Weight-Average Molecular Weight of Water-Insoluble Polymer

The weight-average molecular weight of the polymer was measured by gel chromatography [GPC apparatus: "HLC-8120GPC" available from Tosoh Corporation; columns: "TSK-GEL, α-M"×2 available from Tosoh Corporation; flow rate: 1 mL/min] using a solution prepared by dissolving phosphoric acid (guaranteed reagent) available from FUJIFILM Wako Pure Chemical Corporation and lithium bromide (reagent) available from Tokyo Chemical Industry Co., Ltd., in N,N-dimethylformamide (for high-performance liquid chromatography) available from FUJIFILM Wako Pure Chemical Corporation such that concentrations of phosphoric acid and lithium bromide in the resulting solution were 60 mmol/L and 50 mmol/L, respectively, as an eluent, and using monodisperse polystyrenes having known molecular weights as a reference standard substance.

(2) Measurement of Average Particle Sizes of Water-Insoluble Polymer Particles and Pigment-Containing Crosslinked Polymer Particles The polymer particles were respectively subjected to cumulant analysis using a laser particle analyzing system "ELS-8000" available from Otsuka Electrics Co., Ltd., to measure an average particle size thereof. The measurement was conducted under the conditions including a temperature of 25° C., an angle between incident light and detector of 90° and a cumulative number of 100 times, and a refractive index of water (1.333) was input to the analyzing system as a refractive index of the dispersing medium. The concentration of the dispersion to be measured was adjusted to $5 \times 10^{-3}$% by mass in terms of a solid content thereof, and the thus determined cumulant average particle size was defined as the average particle size of the polymer particles.

(3) Measurement of Acid Value of Polymer

Two grams of the crosslinking polymer before being subjected to crosslinking reaction or 2 g of the pigment water dispersion after being subjected to crosslinking reaction were diluted with 50 g of ion-exchanged water, and 3 mL of a 0.1 N sodium hydroxide solution was added to the resulting diluted solution. Then, 0.1 N hydrochloric acid was gradually added dropwise to the thus obtained mixed solution to measure two inflection points of a pH curve thereof. The number of moles of the acid as calculated from the difference between titers of the 0.1 N hydrochloric acid at the two inflection points corresponds to the number of moles of the carboxylic acid contained in the polymer. The thus measured number of moles of the acid was converted into the acid value.

(4) Measurement of Solid Contents of Pigment Water Dispersion and Water-Based Pigment Dispersion Sodium sulfate dried to constant weight in a desiccator was weighed and charged in an amount of 10.0 g in a 30 mL polypropylene container (ϕ: 40 mm; height: 30 mm), and about 1.0 g of a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes to measure a mass thereof. The mass of the sample thus measured after removing the volatile components therefrom was regarded as a mass of solids therein. The solid content of the sample was calculated by dividing the mass of the solids by the mass of the sample initially added.

(5) Measurement of Water Solubility Rate of Epoxy Compound

A glass tube (25 mmϕ in diameter×250 mm in height) was charged with 90 parts by mass of ion-exchanged water and 10 parts by mass of an epoxy compound at room temperature (25° C.). The glass tube thus charged was allowed to stand in a thermostatic bath controlled to a water temperature of 25° C. for 1 hour. Next, the contents of the glass tube were vigorously shaken for 1 minute, and then the glass tube was placed again in the thermostatic bath, followed by allowing the glass tube to stand in the bath for 10 minutes. Then, the mass of undissolved components in the resulting mixture in the glass tube was measured to calculate a water solubility rate (% by mass) of the epoxy compound.

Production Example 1 (Production of Pigment Water Dispersion A1)

Twenty five parts of a styrene-acrylic acid copolymer "JONCRYL 690" (weight-average molecular weight: 16500; acid value: 240 mgKOH/g) available from BASF Japan, Ltd., were mixed with 78.6 parts of MEK. Then, 6.3 parts of a 5N sodium hydroxide aqueous solution (sodium hydroxide solid content: 16.9%; for volumetric titration) available from FUJIFILM Wako Pure Chemical Corporation were added into the resulting mixed solution to neutralize the polymer such that the ratio of the number of moles of sodium hydroxide to the number of moles of carboxy groups of the polymer was 40% (neutralization degree: 40 mol %). Furthermore, 100 parts of ion-exchanged water and then 100 parts of a cyan pigment "TGR-SD" (tradename; C.I. Pigment Blue 15:3) available from DIC Corporation were added to the resulting mixture. The thus obtained mixture was stirred at 20° C. for 60 minutes using a disper "ULTRA DISPER" (tradename) available from Asada Iron Works Co., Ltd., while operating a disper blade thereof at a rotating speed of 7000 rpm. The resulting mixture was subjected to dispersion treatment under a pressure of 200 MPa using a "Microfluidizer" (tradename) available from Microfluidics Corporation by passing the mixture through the device 10 times. The obtained dispersion was mixed with 250 parts of ion-exchanged water and stirred together, and then allowed to stand at 60° C. under reduced pressure to completely remove MEK therefrom, followed by further removing a part of water therefrom. The resulting dispersion was subjected to filtration treatment using a 25 mL-capacity needleless syringe available from Terumo Corporation fitted with a 5 μm-mesh filter (acetyl cellulose membrane; outer diameter: 2.5 cm) available from FUJIFILM Corporation to remove coarse particles therefrom, thereby obtaining a pigment water dispersion A1 having a solid content of 20% (in which pigment content: 75%; polymer content: 25%) (acid value: 240 mgKOH/g; average particle size: 108 nm).

Production Example 2 (Production of Water-Based Pigment Dispersion A2)

One hundred parts of the pigment water dispersion A1 (solid content: 20%) were sampled and filled in a screw-neck glass bottle, and 0.96 part of trimethylolpropane polyglycidyl ether containing three epoxy groups in a molecule thereof "DENACOL EX-321" (water solubility rate: 27%; epoxy value: 140) as a crosslinking agent available from Nagase ChemteX Corporation was added to the glass bottle, followed by hermetically sealing the glass bottle with a screw cap. The contents of the glass bottle were heated at 70° C. for 5 hours while stirring with a stirrer. After the elapse of 5 hours, the contents of the glass bottle were cooled to room temperature, and then subjected to filtration treatment using a 25 mL-capacity needleless syringe available from Terumo Corporation fitted with a 5 μm-mesh filter (acetyl cellulose membrane; outer diameter: 2.5 cm) available from FUJIFILM Corporation, thereby obtaining a water-based pigment dispersion A2 of pigment-containing crosslinked polymer particles (acid value: 117 mgKOH/g; average particle size: 114 nm).

Production Example 3 (Production of Water-Based Pigment Dispersion A3)

One hundred parts of the pigment water dispersion A1 (solid content: 20%) were sampled and filled in a screw-neck glass bottle, and 1.04 parts of 1,6-hexanediol diglycidyl ether containing two epoxy groups in a molecule thereof "DENACOL EX-212" (water solubility rate: 36%; epoxy value: 151) as a crosslinking agent available from Nagase ChemteX Corporation were added to the glass bottle, followed by hermetically sealing the glass bottle with a screw cap. The contents of the glass bottle were heated at 70° C. for 5 hours while stirring with a stirrer. After the elapse of 5 hours, the contents of the glass bottle were cooled to room temperature, and then subjected to filtration treatment using a 25 mL-capacity needleless syringe available from Terumo Corporation fitted with a 5 μm-mesh filter (acetyl cellulose membrane; outer diameter: 2.5 cm) available from FUJIFILM Corporation, thereby obtaining a water-based pigment dispersion A3 of pigment-containing crosslinked polymer particles (acid value: 114 mgKOH/g; average particle size: 114 nm).

Production Example 4 (Production of Water-Based Pigment Dispersion A4)

The same procedure as in Production Example 1 was repeated except that 25 parts of a commercially available styrene-acrylic acid copolymer "JONCRYL 586" (weight average molecular weight: 4300; acid value: 108 mgKOH/g) available from BASF Japan, Ltd., were used in place of 25 parts of "JONCRYL 690", thereby obtaining a pigment water dispersion. One hundred parts of the thus obtained pigment water dispersion (solid content: 20%) were sampled and filled in a screw-neck glass bottle, and 0.43 part of "DENACOL EX-321" was added to the glass bottle, followed by hermetically sealing the glass bottle with a screw cap. The contents of the glass bottle were heated at 70° C. for 5 hours while stirring with a stirrer. After the elapse of 5 hours, the contents of the glass bottle were cooled to room temperature, and then subjected to filtration treatment using a 25 mL-capacity needleless syringe available from Terumo Corporation fitted with a 5 µm-mesh filter (acetyl cellulose membrane; outer diameter: 2.5 cm) available from FUJIFILM Corporation, thereby obtaining a water-based pigment dispersion A4 of pigment-containing crosslinked polymer particles (acid value: 47 mgKOH/g; average particle size: 112 nm).

Production Example 5 (Production of Polymer Emulsion B1)

Twenty five parts of "JONCRYL 690" were mixed in 100 parts of ion-exchanged water. Then, 6.3 parts of a 5N sodium hydroxide aqueous solution (sodium hydroxide solid content: 16.9%; for volumetric titration) available from FUJIFILM Wako Pure Chemical Corporation were added into the resulting mixed solution to neutralize the polymer such that the ratio of the number of moles of sodium hydroxide to the number of moles of carboxy groups of the polymer was 40%. The thus obtained solution was stirred at 90° C. for 3 hours using a magnetic stirrer to self-emulsify the polymer, thereby obtaining a polymer emulsion B1 having a solid content of 20% (acid value: 240 mgKOH/g; average particle size: 20 nm).

Production Example 6 (Production of Polymer Emulsion B2)

One hundred parts of the polymer emulsion B1 (solid content: 20%) were sampled and filled in a screw-neck glass bottle, and 5.16 parts of "DENACOL EX-212" as a crosslinking agent and 15.2 parts of ion-exchanged water were added to the glass bottle, followed by hermetically sealing the glass bottle with a screw cap. The contents of the glass bottle were heated at 70° C. for 5 hours while stirring with a stirrer. After the elapse of 5 hours, the contents of the glass bottle were cooled to room temperature, and then subjected to filtration treatment using a 25 mL-capacity needleless syringe available from Terumo Corporation fitted with a 5 µm-mesh filter (acetyl cellulose membrane; outer diameter: 2.5 cm) available from FUJIFILM Corporation, thereby obtaining a polymer emulsion B2 (acid value: 114 mgKOH/g; average particle size: 52 nm).

Production Example 7 (Production of Polymer Emulsion B3)

The same procedure as in Production Example 6 was repeated except that 2.58 parts of "DENACOL EX-212" and 5.46 parts of ion-exchanged water were used in place of 5.16 parts of "DENACOL EX-212" and 15.2 parts of ion-exchanged water, respectively, thereby obtaining a polymer emulsion B3 (acid value: 170 mgKOH/g; average particle size: 48 nm).

Production Example 8 (Production of Polymer Emulsion B4)

The same procedure as in Production Example 6 was repeated except that 4.79 parts of "DENACOL EX-321" and 13.8 parts of ion-exchanged water were used in place of 5.16 parts of "DENACOL EX-212" and 15.2 parts of ion-exchanged water, respectively, thereby obtaining a polymer emulsion B4 (acid value: 113 mgKOH/g; average particle size: 51 nm).

Production Example 9 (Production of Polymer Emulsion B5)

Nine parts of acrylic acid, 39.9 parts of styrene, 11.1 parts of 1,6-hexanediol diacrylate as a polyfunctional monomer, 0.72 pat of "LATEMUL E-118B" (sodium polyoxyethylene-alkylethersulfate) as an emulsifier available from Kao Corporation, 0.048 part of potassium persulfate as a polymerization initiator available from FUJIFILM Wako Pure Chemical Corporation and 240 parts of ion-exchanged water were charged into a reaction vessel equipped with a dropping funnel, and mixed with each other, and an inside atmosphere of the reaction vessel was replaced with nitrogen gas, thereby obtaining a monomer solution. In a nitrogen atmosphere, the monomer solution in the reaction vessel was heated from room temperature to 80° C. over 30 minutes while stirring, and then while maintaining the monomer solution in the reaction vessel at 80° C., the monomer solution was further stirred for 3 hours. After the elapse of 3 hours, the contents of the reaction vessel were cooled to room temperature, and then subjected to filtration treatment using a 25 mL-capacity needleless syringe available from Terumo Corporation fitted with a 5 µm-mesh filter (acetyl cellulose membrane; outer diameter: 2.5 cm) available from FUJIFILM Corporation, thereby obtaining a polymer emulsion B5 (acid value: 117 mgKOH/g; average particle size: 92 nm).

Production Example 10 (Production of Polymer Emulsion B6)

The same procedure as in Production Example 9 was repeated except that 18 parts of acrylic acid and 42 parts of styrene were used in place of 9 parts of acrylic acid, 39.9 parts of styrene and 11.1 parts of 1,6-hexanediol diacrylate as a polyfunctional monomer, thereby obtaining a polymer emulsion B6 (acid value: 194 mgKOH/g; average particle size: 96 nm).

Production Example 11 (Production of Polymer Emulsion B7)

One hundred parts of the polymer emulsion B6 (solid content: 20%) were sampled and filled in a screw-neck glass bottle, and 2.52 parts of "DENACOL EX-212" as a crosslinking agent and 10.1 parts of ion-exchanged water were added to the glass bottle, followed by hermetically sealing the glass bottle with a screw cap. The contents of the glass bottle were heated at 70° C. for 5 hours while stirring with a stirrer. After the elapse of 5 hours, the contents of the glass bottle were cooled to room temperature, and then subjected to filtration treatment using a 25 mL-capacity needleless syringe available from Terumo Corporation fitted with a 5 µm-mesh filter (acetyl cellulose membrane; outer diameter: 2.5 cm) available from FUJIFILM Corporation, thereby obtaining a polymer emulsion B7 (acid value: 168 mgKOH/g; average particle size: 102 nm).

Production Example 12 (Production of Polymer Emulsion B8)

The same procedure as in Production Example 9 was repeated except that 1.5 parts of methacrylic acid, 46.5 parts of methyl methacrylate and 46.5 parts of 2-ethylhexyl methacrylate were used in place of 9 parts of acrylic acid, 39.9 parts of styrene and 11.1 parts of 1,6-hexanediol diacrylate as a polyfunctional monomer, thereby obtaining a polymer emulsion B8 (number-average molecular weight: 300,000; acid value: 16 mgKOH/g; average particle size: 100 nm).

Production Example 13 (Production of Polymer Emulsion B9)

One hundred parts of the polymer emulsion B8 (solid content: 20%) were sampled and filled in a screw-neck glass bottle, and 0.31 part of "DENACOL EX-212" as a crosslinking agent and 1.25 parts of ion-exchanged water were added to the glass bottle, followed by hermetically sealing the glass bottle with a screw cap. The contents of the glass bottle were heated at 70° C. for 5 hours while stirring with a stirrer. After the elapse of 5 hours, the contents of the glass bottle were cooled to room temperature, and then subjected to filtration treatment using a 25 mL-capacity needleless syringe available from Terumo Corporation fitted with a 5 μm-mesh filter (acetyl cellulose membrane; outer diameter: 2.5 cm) available from FUJIFILM Corporation, thereby obtaining a polymer emulsion B9 (acid value: 10 mgKOH/g; average particle size: 103 nm).

Production Example 14 (Production of Pigment Water Dispersion A5)

The same procedure as in Production Example 1 was repeated except that 25 parts of a commercially available styrene-acrylic acid copolymer "JONCRYL 67" (weight-average molecular weight: 12500; acid value: 213 mgKOH/g) available from BASF Japan, Ltd., were used in place of 25 parts of "JONCRYL 690", and 9.1 parts of the 5N sodium hydroxide aqueous solution were used in place of 6.3 parts of the 5N sodium hydroxide aqueous solution, thereby obtaining a pigment water dispersion. One hundred parts of the thus obtained pigment water dispersion (solid content: 20%) were sampled and filled in a screw-neck glass bottle, and 0.79 part of "DENACOL EX-321" was added to the glass bottle, followed by hermetically sealing the glass bottle with a screw cap. The contents of the glass bottle were heated at 70° C. for 5 hours while stirring with a stirrer. After the elapse of 5 hours, the contents of the glass bottle were cooled to room temperature, and then subjected to filtration treatment using a 25 mL-capacity needleless syringe available from Terumo Corporation fitted with a 5 μm-mesh filter (acetyl cellulose membrane; outer diameter: 2.5 cm) available from FUJIFILM Corporation, thereby obtaining a pigment water dispersion A5 (acid value: 123 mgKOH/g; average particle size: 112 nm).

Production Example 15 (Production of Pigment Water Dispersion A6)

The same procedure as in Production Example 14 was repeated except that 1.58 parts of "DENACOL EX-321" were used in place of 0.79 part of "DENACOL EX-321", thereby obtaining a pigment water dispersion A6 (acid value: 62 mgKOH/g; average particle size: 110 nm).

Production Example 16 (Production of Pigment Water Dispersion A7)

The same procedure as in Production Example 1 was repeated except that 25 parts of a commercially available styrene-acrylic acid copolymer "JONCRYL 68" (weight-average molecular weight: 10000; acid value: 195 mgKOH/g) available from BASF Japan, Ltd., were used in place of 25 parts of "JONCRYL 690", and 8.4 parts of the 5N sodium hydroxide aqueous solution were used in place of 6.3 parts of the 5N sodium hydroxide aqueous solution, thereby obtaining a pigment water dispersion. One hundred parts of the thus obtained pigment water dispersion (solid content: 20%) were sampled and filled in a screw-neck glass bottle, and 0.96 part of "DENACOL EX-321" was added to the glass bottle, followed by hermetically sealing the glass bottle with a screw cap. The contents of the glass bottle were heated at 70° C. for 5 hours while stirring with a stirrer. After the elapse of 5 hours, the contents of the glass bottle were cooled to room temperature, and then subjected to filtration treatment using a 25 mL-capacity needleless syringe available from Terumo Corporation fitted with a 5 μm-mesh filter (acetyl cellulose membrane; outer diameter: 2.5 cm) available from FUJIFILM Corporation, thereby obtaining a pigment water dispersion A7 (acid value: 94 mgKOH/g; average particle size: 108 nm).

Production Example 17 (Production of Pigment Water Dispersion A8)

The same procedure as in Production Example 2 was repeated except that 2.63 parts of a commercially available carbodiimide crosslinking agent "CARBODILITE V-10" available from NISSHINBO Chemical Inc., were used in place of 0.96 part of "DENACOL EX-321", thereby obtaining a pigment water dispersion A8 (acid value: 110 mgKOH/g; average particle size: 122 nm).

Production Example 18 (Production of Pigment Water Dispersion A9)

The same procedure as in Production Example 17 was repeated except that 4.38 parts of the commercially available "CARBODILITE V-10" were used in place of 2.63 parts of "CARBODILITE V-10", thereby obtaining a pigment water dispersion A9 (acid value: 64 mgKOH/g; average particle size: 129 nm).

TABLE 1

| | | | Acid value (mgKOH/g) | | Crosslinking degree (mol %) | Average particle size (nm) |
|---|---|---|---|---|---|---|
| | | | Before crosslinking | After crosslinking | | |
| Dispersion of pigment-containing crosslinked polymer particles (A), etc. | Production Example 1 | A1 | 240 | — | — | 108 |
| | Production Example 2 | A2 | 240 | 117 | 40 | 114 |
| | Production Example 3 | A3 | 240 | 114 | 40 | 114 |
| | Production Example 4 | A4 | 108 | 47 | 40 | 112 |
| | Production Example 14 | A5 | 213 | 123 | 30 | 112 |
| | Production Example 15 | A6 | 213 | 62 | 60 | 110 |

TABLE 1-continued

|  |  |  | Acid value (mgKOH/g) | | Crosslinking degree (mol %) | Average particle size (nm) |
|---|---|---|---|---|---|---|
|  |  |  | Before crosslinking | After crosslinking |  |  |
|  | Production Example 16 | A7 | 195 | 94 | 40 | 108 |
|  | Production Example 17 | A8 | 240 | 110 | 30 | 122 |
|  | Production Example 18 | A9 | 240 | 64 | 50 | 129 |
| Polymer emulsion (B) | Production Example 5 | B1 | 240 | — | — | 20 |
|  | Production Example 6 | B2 | 240 | 114 | 40 | 52 |
|  | Production Example 7 | B3 | 240 | 170 | 20 | 48 |
|  | Production Example 8 | B4 | 240 | 113 | 40 | 51 |
|  | Production Example 9 | B5 | — | 117 | (Polyfunctional monomer) | 92 |
|  | Production Example 10 | B6 | 194 | — | — | 96 |
|  | Production Example 11 | B7 | 194 | 168 | 20 | 102 |
|  | Production Example 12 | B8 | 16 | — | — | 100 |
|  | Production Example 13 | B9 | 16 | 10 | 40 | 103 |

Example 1 (Production of Water-Based Ink)

Forty parts of the water-based pigment dispersion A2 of the pigment-containing crosslinked polymer particles (solid content: 20%) obtained in Production Example 2, 25 parts of the polymer emulsion B2 (solid content: 20%) obtained in Production Example 6, 30 parts of propylene glycol available from FUJIFILM Wako Pure Chemical Corporation and 1 part of "SURFYNOL 104" (acetylene glycol-based nonionic surfactant; 2,4,7,9-tetramethyl-5-decyne-4,7-idol) available from Nissin Chemical Co., Ltd., were mixed with each other, and 4 parts of ion-exchanged water were further added to the resulting mixture to adjust a whole amount of the mixture to 100 parts, thereby obtaining a water-based ink 1. The amount of water contained in the water-based ink was 56 parts, since the water in the water-based ink included not only water derived from the water-based pigment dispersion A2 of the pigment-containing crosslinked polymer particles, but also water derived from the polymer emulsion B2.

Examples 2 to 12 and Comparative Examples 1 to 7 (Production of Water-Based Inks)

The same procedure as in Example 1 was repeated except that the respective components compounded were changed to those shown in Table 2, thereby obtaining water-based inks 2 to 12 according to Examples and water-based inks 21 to 27 according to Comparative Examples.

The aforementioned water-based inks obtained in Examples 1 to 12 and Comparative Examples 1 to 7 were evaluated with respect to ejection stability and optical density thereof as well as fastness of the printed characters or images by the following methods. The results are shown in Table 2.

(1) Evaluation of Optical Density

Image printing was conducted on a coated paper "OK Topcoat +" available from Oji Paper Co., Ltd., by the following ink-jet printing method using the water-based ink.

Ink-Jet Printing Method

Under the environmental conditions including a temperature of 25±1° C. and a relative humidity of 30±5%, the water-based ink was loaded into a print evaluation apparatus available from Trytech Co., Ltd., equipped with an ink-jet print head "KJ4B-HDO6MHG-STDV" (piezoelectric type) available from Kyocera Corporation.

The operating conditions of the print evaluation apparatus were set to an applied head voltage of 26 V, a frequency of 10 kHz, an ejected ink droplet amount of 5 pL, a head temperature of 32° C., a resolution of 600 dpi, the number of ink shots for flushing before being ejected of 200 shots and a negative pressure of −4.0 kPa, and the printing medium was fixed on a transportation table by vacuum such that the longitudinal direction of the printing medium was aligned with a transportation direction thereof. A printing command was transmitted to the aforementioned print evaluation apparatus to print a Duty 100% image on the printing medium. The resulting printed material was allowed to stand for one day, and then subjected to measurement of optical density at optional 10 positions thereon using an optical densitometer "SpectroEye" available from Gretag-Macbeth AG to calculate an average of the measured values.

If the average optical density thus determined was not less than 1.45, the water-based ink was usable in the practical applications.

(2) Evaluation of Ejection Stability (Ejection Restorability)

After conducting the image printing by the ink-jet printing method as described in the aforementioned item (1), operation of the printer was once stopped for 30 minutes, and the print head thereof was exposed to atmospheric air. After the elapse of 30 minutes from the stopping, the printing operation of the printer was started again to observe the condition of ejection of the ink from the print head upon preparing the first solid image printed material. The ejection recovery rate (%) was calculated according to the following formula to evaluate ejection stability of the ink.

Ejection Recovery Rate (%)=[(Ink Ejection Area of Solid Image Printed after Exposure of Print Head to Atmospheric Air for 30 Minutes/Ink Ejection Area of Solid Image Printed before Test)]×100

The larger the ejection recovery rate (%) was, the more excellent the ejection stability of the water-based ink became.

Evaluation Ratings

A: Ejection recovery rate of the ink was more than 90%, and a substantially complete printed material was obtained.

B: Ejection recovery rate of the ink was not more than 90% and more than 75%, and the ink was sufficiently usable in the practical applications.

C: Ejection recovery rate of the ink was not more than 75% and more than 60%, and although the non-ejected ink was present, the ink was still usable in the practical applications.

D: Ejection recovery rate of the ink was not more than 60%, and a large amount of the non-ejected ink was present, so that the ink was no longer usable in the practical applications.

(3) Evaluation of Fastness of Printed Characters or Images

After allowing the printed material prepared in the aforementioned item (1) to stand at room temperature (25° C.) for one day, another coated paper "OK Topcoat +" was overlapped on the solid image formed on the printed material, and a load of 490 g (a loaded area: 43 mm×30 mm) was further applied thereonto from above and moved over the surface thereof by 10 reciprocative motions. The reflectance (Black %) of the portion of the overlapped coated paper which was brought into contact with the surface of the solid image formed on the underlying printed material was measured before and after conducting the 10 reciprocative motions, using a handy-type image evaluation system "PIAS (registered trademark)-II" available from Quality Engineering Associates (QEA), Inc. The degree of fouling of the paper (ΔBlack (%); difference in reflectance) was calculated from the values of Black (%) (reflectance) measured before and after conducting the 10 reciprocative motions according to the following formula.

ΔBlack (%)=[Black (%) of overlapped paper before conducting reciprocative motions]−[Black (%) of portion of overlapped paper which was brought into contact with surface of solid image printed after conducting reciprocative motions]

As the value of ΔBlack (%) was reduced, the degree of fouling of the paper was lessened, and it was therefore recognized that the printed image was excellent in fastness.

Evaluation Ratings

A: ΔBlack was less than 0.10%, and substantially no peeling of the printed image occurred.

B: ΔBlack was not less than 0.10% and less than 0.20%.

C: ΔBlack was not less than 0.20% and less than 0.30%.

D: ΔBlack was not less than 0.30%.

If the image fastness of the ink was a rank A or B in the aforementioned evaluating ratings, the ink was usable in the practical applications.

TABLE 2-1

| | | | Examples | | | | | | | | | | | | Comparative Examples | | | | | | |
|---|---|---|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 1 | 2 | 3 | 4 | 5 | 6 | 7 |
| Ink composition (part(s) by mass) | Dispersion of pigment-containing crosslinked polymer particles (A), etc. | A1 | | | | | | | | | | | | | 40 | | | | | | |
| | | A2 | 40 | | 40 | 40 | 40 | 40 | 40 | 40 | 40 | 40 | | | | 40 | | | | | |
| | | A3 | | 40 | | | | | | | | | | | | | | | | | |
| | | A4 | | | | | | | | | | | | | | | 40 | 40 | | | |
| | | A5 | | | | | | | | | | | 40 | | | | | | | | |
| | | A6 | | | | | | | | | | | | 40 | | | | | | | |
| | | A7 | | | | | | | | | | | | | | | | | 40 | | |
| | | A8 | | | | | | | | | | | | | | | | | | 40 | |
| | | A9 | | | | | | | | | | | | | | | | | | | 40 |
| | Polymer emulsion (B) | B1 | | | | | | | | | 25 | | | | | | | | | | |
| | | B2 | 25 | 25 | | | | | | | | 25 | 25 | 25 | | 25 | 25 | 25 | 25 | | | |
| | | B3 | | | 25 | | | | | | | | | | | | | | | | | |
| | | B4 | | | | 25 | | | | | | | | | | | | | | | | |
| | | B5 | | | | | 25 | | | | | | | | | | | | | | | |
| | | B6 | | | | | | | | | | | | | 25 | | | | | | | |
| | | B7 | | | | | | | 25 | | | | | | | | | | | | | |
| | | B8 | | | | | | | | | | | | | 25 | | | | | | | |
| | | B9 | | | | | | 25 | | | | | | | | | | | | | | |

TABLE 2-2

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Ink composition (part(s) by mass) | Propylene glycol | 30 | 30 | 30 | 30 | 30 | 30 | 30 | 30 | 30 | 30 |
| | SURFYNOL 104 | 1 | 1 | 1 | 1 | 1 | 1 | 1 | 1 | 1 | 1 |
| | Ion-exchanged water | * | * | * | * | * | * | * | * | * | * |
| Evaluation | Optical density | 2.00 | 1.92 | 1.85 | 2.00 | 1.85 | 1.7 | 1.59 | 1.62 | 1.56 | 1.47 |
| | Ejection stability | A | A | B | A | B | B | B | B | C | C |
| | Fastness of printed characters or images | A | A | A | B | A | A | B | A | A | B |

TABLE 2-2-continued

|  |  | Examples | | Comparative Examples | | | | | | |
|---|---|---|---|---|---|---|---|---|---|---|
|  |  | 11 | 12 | 1 | 2 | 3 | 4 | 5 | 6 | 7 |
| Ink composition (part(s) by mass) | Propylene glycol | 30 | 30 | 30 | 30 | 30 | 30 | 30 | 30 | 30 |
|  | SURFYNOL 104 | 1 | 1 | 1 | 1 | 1 | 1 | 1 | 1 | 1 |
|  | Ion-exchanged water | * | * | * | * | * | * | * | * | * |
| Evaluation | Optical density | 1.78 | 1.93 | 1.3 | 1.85 | 1.4 | 1.21 | 1.42 | 1.21 | 1.1 |
|  | Ejection stability | B | A | D | A | B | C | C | D | D |
|  | Fastness of printed characters or images | A | A | A | D | D | A | B | B | B |

Note
*: Balance

From Table 2, it was confirmed that the water-based inks 1 to 12 obtained in Examples of the present invention were excellent in optical density, ejection stability (ejection restorability) and fastness of the printed characters or images.

On the other hand, from Comparative Example 1, it was confirmed that the water-based ink obtained in Comparative Example 1 using no pigment-containing crosslinked polymer particles (A) was deteriorated in ejection stability (ejection restorability) and optical density, and from Comparative Example 2, it was confirmed that the water-based ink obtained in Comparative Example 2 using no polymer emulsion (B) was deteriorated in fastness of the printed characters or images.

In addition, from the comparison between Comparative Examples 3 and 4, it was confirmed that in the case where the acid value of the pigment-containing crosslinked polymer particles was low, the water-based ink obtained in Comparative Example 4 to which the polymer emulsion (B) was added was improved in fastness of the printed characters or images, and on the other hand, was deteriorated in optical density, as compared to the water-based ink obtained in Comparative Example 3 to which no polymer emulsion (B) was added.

From Comparative Example 5, it was confirmed that when using the pigment-containing crosslinked polymer particles formed by crosslinking the polymer containing the constitutional unit derived from the carboxylic acid monomer having an acid value of less than 200 mgKOH/g (i.e., 195 mgKOH/g) with the epoxy compound, the resulting water-based ink was deteriorated in optical density.

From Comparative Examples 6 and 7, it was confirmed that when crosslinking the polymer using not the epoxy compound but the carbodiimide crosslinking agent, the resulting water-based inks were deteriorated in optical density and ejection stability (ejection restorability).

INDUSTRIAL APPLICABILITY

The water-based ink of the present invention is excellent in ejection stability and fastness of the printed characters or images while maintaining good optical density, and is therefore useful, in particular, as a water-based ink for ink-jet printing.

The invention claimed is:

1. A water-based ink comprising at least pigment-containing water-insoluble crosslinked polymer particles (A), a polymer emulsion (B) and water, in which a water-insoluble crosslinked polymer constituting the crosslinked polymer particles (A) is obtained by subjecting a polymer that comprises a constitutional unit derived from a carboxylic acid monomer having an acid value of not less than 200 mg KOH/g and a constitutional unit derived from a hydrophobic monomer, to crosslinking reaction with an epoxy compound, a polymer constituting the polymer emulsion (B) comprises a constitutional unit derived from a carboxylic acid monomer and a constitutional unit derived from a hydrophobic monomer, the polymer constituting the polymer emulsion (B) is in the form of a crosslinked polymer, and the crosslinked polymer is in the form of the polymer obtained by crosslinking an uncrosslinked polymer with a polyfunctional epoxy compound, wherein the crosslinked polymer constituting the polymer emulsion (B) is obtained by crosslinking reaction with a glycidyl ether compound of a polyhydric alcohol comprising a hydrocarbon group having not less than 3 and not more than 8 carbon atoms.

2. The water-based ink according to claim 1, wherein the glycidyl ether compound of the polyhydric alcohol is at least one compound selected from the group consisting of trimethylolpropane polyglycidyl ether, 1,6-hexanediol diglycidyl ether and pentaerythritol polyglycidyl ether.

3. The water-based ink according to claim 1, wherein a crosslinking degree of the polymer constituting the polymer emulsion (B) is not less than 5 mol % and not more than 80 mol %.

4. The water-based ink according to claim 1, wherein an acid value of the polymer constituting the polymer emulsion (B) is not less than 5 mg KOH/g and not more than 250 mg KOH/g.

5. The water-based ink according to claim 1, wherein a crosslinking degree of the water-insoluble crosslinked polymer constituting the crosslinked polymer particles (A) is not less than 20 mol % and not more than 80 mol %.

6. The water-based ink according to claim 1, wherein an acid value of the water-insoluble crosslinked polymer constituting the crosslinked polymer particles (A) is not less than 80 mg KOH/g and not more than 180 mg KOH/g.

7. The water-based ink according to claim 1, wherein the water-insoluble crosslinked polymer constituting the crosslinked polymer particles (A) is obtained by crosslinking reaction with a glycidyl ether compound of a polyhydric alcohol comprising a hydrocarbon group having not less than 3 and not more than 8 carbon atoms.

8. The water-based ink according to claim 1, wherein a content of the pigment-containing water-insoluble crosslinked polymer particles (A) in the water-based ink is not less than 2% by mass and not more than 17% by mass.

9. The water-based ink according to claim 1, wherein a content of the polymer emulsion (B) in the water-based ink is not less than 1% by mass and not more than 10% by mass.

10. The water-based ink according to claim 1, wherein a mass ratio of the pigment-containing water-insoluble crosslinked polymer particles (A) to polymer particles in the polymer emulsion (B) [pigment-containing water-insoluble crosslinked polymer particles (A)/polymer particles)] in the water-based ink is from 10/1 to 0.3/1.

11. The water-based ink according to claim 1, for ink-jet printing.

12. An ink-jet printing method, comprising the steps of loading the water-based ink according to claim 1 to an ink-jet printing apparatus and ejecting the water-based ink in the form of droplets of the ink from the ink-jet printing apparatus onto a printing medium to print characters or images on the printing medium.

13. An ink-jet printing method according to claim 12, wherein the printing medium is at least one film selected from the group consisting of a polyester film, a polyvinyl chloride film, a polypropylene film and a polyethylene film.

* * * * *